(12) United States Patent
Sun et al.

(10) Patent No.: US 12,455,972 B2
(45) Date of Patent: Oct. 28, 2025

(54) DATA PROTECTION METHOD, APPARATUS, MEDIUM AND ELECTRONIC DEVICE

(71) Applicant: Lemon Inc., Grand Cayman (KY)

(72) Inventors: Jiankai Sun, Los Angeles, CA (US); Xin Yang, Los Angeles, CA (US); Aonan Zhang, Los Angeles, CA (US); Weihao Gao, Beijing (CN); Junyuan Xie, Beijing (CN); Chong Wang, Los Angeles, CA (US)

(*) Notice: Subject to any disclaimer, the term of this patent is extended or adjusted under 35 U.S.C. 154(b) by 58 days.

(21) Appl. No.: 18/565,962

(22) PCT Filed: Jul. 15, 2022

(86) PCT No.: PCT/SG2022/050495
§ 371 (c)(1),
(2) Date: Nov. 30, 2023

(87) PCT Pub. No.: WO2023/033717
PCT Pub. Date: Mar. 9, 2023

(65) Prior Publication Data
US 2024/0220641 A1    Jul. 4, 2024

(30) Foreign Application Priority Data

Sep. 2, 2021  (CN) .......................... 202111028385.9

(51) Int. Cl.
*G06F 21/60* (2013.01)
*G06N 20/00* (2019.01)

(52) U.S. Cl.
CPC ........... *G06F 21/602* (2013.01); *G06N 20/00* (2019.01)

(58) Field of Classification Search
CPC ........... G06F 21/602; G06F 2221/2107; G06F 18/214; G06N 20/00; G06N 3/08
See application file for complete search history.

(56) References Cited

U.S. PATENT DOCUMENTS

| 11,270,028 B1 * | 3/2022 | Chen | ................... H04L 9/008 |
| 12,051,174 B2 * | 7/2024 | Xie | ................... G06F 18/295 |

(Continued)

FOREIGN PATENT DOCUMENTS

| CN | 110276210 A | 9/2019 |
| CN | 110990857 A | 4/2020 |

(Continued)

OTHER PUBLICATIONS

ISA Singapore Patent Office, Written Opinion Issued in Application No. PCT/SG2022/050495, Feb. 28, 2023, WIPO, 11 Pages.

(Continued)

*Primary Examiner* — Michael Won
(74) *Attorney, Agent, or Firm* — Alleman Hall & Tuttle LLP

(57) ABSTRACT

The present disclosure relates to a data protection method, apparatus, medium and electronic device. The method comprises: obtaining a specified batch of reference samples of an active participant of a joint training model; determining generation gradient information of the first reference sample; determining target gradient information sent to the passive participant according to the generation gradient information, and sending the target gradient information to the passive participant, to update, by the passive participant, parameters of the joint training model according to the target gradient information. Through the above solution, the influence of the generated data on the training process and model performance of the joint training model is avoided as much as possible, and the privacy and security of data are improved.

20 Claims, 5 Drawing Sheets

(56) References Cited

U.S. PATENT DOCUMENTS

| | | | |
|---|---|---|---|
| 2017/0372201 A1 | 12/2017 | Gupta et al. | |
| 2021/0209515 A1* | 7/2021 | Song | H04L 9/008 |
| 2023/0131694 A1* | 4/2023 | Saber | G06N 3/0455 |
| | | | 370/252 |
| 2025/0173613 A1* | 5/2025 | Oktay | G16H 15/00 |

FOREIGN PATENT DOCUMENTS

| | | |
|---|---|---|
| CN | 110990871 A | 4/2020 |
| CN | 111178538 A | 5/2020 |
| CN | 111582505 A | 8/2020 |
| CN | 111783142 A | 10/2020 |
| CN | 111970304 A | 11/2020 |
| CN | 112016632 A | 12/2020 |
| CN | 112257876 A | 1/2021 |
| CN | 112287377 A | 1/2021 |
| CN | 112288100 A | 1/2021 |
| CN | 112347476 A | 2/2021 |
| CN | 112434064 A | 3/2021 |
| CN | 112529100 A | 3/2021 |
| CN | 112633409 A | 4/2021 |
| CN | 113011587 A | 6/2021 |
| CN | 113190871 A | 7/2021 |
| CN | 113190872 A | 7/2021 |
| WO | 2020029589 A1 | 2/2020 |
| WO | 2021121106 A1 | 6/2021 |

OTHER PUBLICATIONS

ISA Intellectual Property Office of Singapore, International Search Report Issued in Application No. PCT/SG2022/050495, Feb. 28, 2023, WIPO, 4 pages.

China National Intellectual Property Administration, Office Action and Search Report Issued in Application No. 202111028385.9, Mar. 8, 2023, 8 pages.

China National Intellectual Property Administration, Notice of Allowance Issued in Application No. 202111028385.9, Jul. 7, 2023, 5 pages.

Chen, L. et al., "Frontiers and Applications of Data Security Technology from the Perspective of Compliance," Frontiers of Data & Computing, Jun. 2021, 13 pages. (Submitted with English Abstract).

Xu, Q., et al., "Middleware and blockchain based interconnecting system of heterogeneous privacy preserving computing platforms," Apr. 22, 2021, 13 pages (Submitted with English Abstract).

Zhang, J. et al., "A Privacy-Enhanced Federated Learning Scheme for Big Data Analytics," 2019 IEEE Global Communications Conference (GLOBECOM), Big Island, Hawaii, USA, Dec. 9, 2019, 4 pages.

Zhou, Z. et al., "Privacy-Preserving Federated learning Framework with General Aggregation and Multiparty Entity Matching," Hindawi Wireless Communications and Mobile Computing, Jun. 28, 2021, 14 pages.

Xin, W., "Research on Privacy Protection for Distributed Computing," China's Outstanding Doctoral Dissertations, Text Database Information Technology Series, No. 1. Jan. 15, 2021, 3 pages (Submitted with partial English translation).

* cited by examiner

DATA PROTECTION METHOD, APPARATUS, MEDIUM AND ELECTRONIC DEVICE

CROSS REFERENCE TO RELATED APPLICATION(S)

The present application is a national stage application filed under 35 U.S.C. 371 based on International Patent Application No. PCT/SG2022/050495, filed on Jul. 15, 2022, which claims priority to Chinese patent application No. 202111028385.9 entitled "Data Protection Method, Apparatus, Medium and Electronic Device" filed on the filing date Sep. 2, 2021, the entire disclosure of which is hereby incorporated by reference in its entirety.

FIELD

The present disclosure relates to the technical field of computers, and particularly to a data protection method, apparatus, medium and electronic device.

BACKGROUND

With the development of artificial intelligence technology, machine learning has been used more and more widely. In recent years, in order to protect data security and solve the problem of data islanding, a related method usually employs a joint training model to complete the joint training of a machine learning model without exposing the original data. Each enterprise participating joint modeling is usually referred to as a participant. In a process of training the joint training model, in order to avoid information leakage and improve data security, the information of each participant is important data to be protected, and it is an important issue in the joint learning process to ensure the performance of the joint training model while avoiding information leakage.

SUMMARY

This Summary is provided to introduce a selection of concepts in a simplified form that are further described below in the Detailed Description. This Summary is not intended to identify key features or essential features of the claimed technical solutions, nor is it intended to be used to limit the scope of the claimed technical solutions.

In a first aspect, the present disclosure provides a data protection method, comprising: obtaining a specified batch of reference samples of an active participant of a joint training model, wherein the specified batch of reference samples of the active participant includes a first reference sample and a second reference sample, target encryption identification information corresponding to the first reference sample is not target encryption identification information of the active participant, target encryption identification information corresponding to the second reference sample is target encryption identification information of the active participant, and the target encryption identification information is obtained by encrypting according to a key of the active participant and a key of a passive participant of the joint training model; determining generation gradient information of the first reference sample, wherein the generation gradient information is determined according to at least one of the following information items: actual gradient information of the second reference sample, generation label information of the first reference sample, and feature information of a specified batch of reference samples of the passive participant; determining target gradient information sent to the passive participant according to the generation gradient information, and sending the target gradient information to the passive participant, to update, by the passive participant, parameters of the joint training model according to the target gradient information.

In a second aspect, the present disclosure provides a data protection apparatus, comprising: an obtaining module for obtaining a specified batch of reference samples of an active participant of a joint training model, wherein the specified batch of reference samples of the active participant includes a first reference sample and a second reference sample, target encryption identification information corresponding to the first reference sample is not target encryption identification information of the active participant, target encryption identification information corresponding to the second reference sample is target encryption identification information of the active participant, and the target encryption identification information is obtained by encrypting according to a key of the active participant and a key of a passive participant of the joint training model; a determination module for determining generation gradient information of the first reference sample, wherein the generation gradient information is determined according to at least one of the following information items: actual gradient information of the second reference sample, generation label information of the first reference sample, and feature information of a specified batch of reference samples of the passive participant; a sending module for determining the target gradient information sent to the passive participant according to the generation gradient information, and sending the target gradient information to the passive participant, to update, by the passive participant, parameters of the joint training model according to the target gradient information.

In a third aspect, the present disclosure provides a computer-readable medium on which a computer program is stored, the computer program when executed by a processing device, implements steps of the method according to the first aspect of the present disclosure.

In a fourth aspect, the present disclosure provides an electronic device, comprising: storage means on which a computer program is stored; processing means for executing the computer program in the storage means to implement steps of the method according to the first aspect of the present disclosure.

Other features and advantages of the present disclosure will be described in detail in the following Detailed Description of Preferred embodiments.

BRIEF DESCRIPTION OF THE DRAWINGS

The above and other features, advantages, and aspects of embodiments of the present disclosure will become more apparent with reference to the following figures and the following specific embodiments. Throughout the figures, the same or similar reference numerals indicate the same or similar elements. It should be understood that the figures are diagrammatic and that elements are not necessarily drawn to scale.

DETAILED DESCRIPTION OF EMBODIMENTS

Hereinafter, embodiments of the present disclosure will be described in more detail with reference to the accompanying drawings. While certain embodiments of the present disclosure have been illustrated in the accompanying drawings, it is to be understood that the disclosure may be embodied in various forms and should not be construed as being limited to the embodiments set forth herein; rather, these embodiments are provided to help understand the present disclosure more thoroughly and completely. It should be understood that the drawings and examples of the present disclosure are for illustrative purposes only and are not intended to limit the scope of the present disclosure.

It should be understood that the various steps recited in method embodiments of the present disclosure may be performed in a different order and/or in parallel. Moreover, the method embodiments may include additional steps and/or omit performing the steps shown. The scope of the present disclosure is not limited in this respect.

As used herein, the terms "comprise", and variations thereof are open-ended terms, i.e., "comprise, but not limited to". The term "based on" is "based, at least in part, on". The term "one embodiment" means "at least one embodiment"; the term "another embodiment" means "at least one further embodiment"; the term "some embodiments" means "at least some embodiments". Relevant definitions of other terms will be given in the following description.

It should be noted that concepts such as "first" and "second" mentioned in the present disclosure are only intended to distinguish different devices, modules, or units and are not intended to limit the order or interdependence of the functions performed by the devices, modules, or units.

It needs to be appreciated that the modifier "a" or "an" in the present disclosure is intended to be illustrative and not restrictive, and those skilled in the art should understand that the modifier should be understood as "one or more" unless the context clearly indicates otherwise.

Names of messages or information interacted between a plurality of devices in embodiments of the present disclosure are for illustrative purposes only and are not intended to limit the scope of such messages or information.

Figure 1:
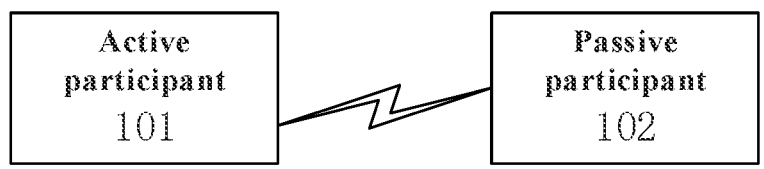
FIG. 1 is a schematic diagram of an implementation environment according to an exemplary embodiment.

Application scenarios of the present disclosure are first described. The present disclosure may be applied to a federal learning or joint learning process. The joint training mode is typically used to achieve joint training of a machine learning model without exposing the original data. For a supervised machine learning model, a participant owning sample label data is typically referred to as an active participant, and a participant not owning the sample label data is typically referred to as a passive participant. The active participant and the passive participant may interact over a network to receive or transmit messages, etc. FIG. 1 is a schematic diagram of an implementation environment according to an exemplary embodiment. As shown in FIG. 1, the implementation environment may include an active participant 101 and a passive participant 102. The active participant 101 and the passive participant 102 may be communicatively coupled, for example, may communicate with each other by using any of 3G, 4G, 5G, NB-IOT, eMTC, LTE, LTE-A, etc.

It should be appreciated that when the operations of sending, receiving and processing data by the active participant are mentioned in the present disclosure, it is understood that these operations are performed by the active participant through a server device of the active participant, and when the operations of sending, receiving and processing data by the passive participant are mentioned in the present disclosure, it is understood that the operations are performed by the passive participant through a server device of the passive participant.

According to the different distribution of data used in federal learning among the participants, federal learning may be classified into three classes: Horizontal Federated Learning (HFL), Vertical Federated Learning (VFL) and Federated Transfer Learning (FTL). The vertical federal learning is feature-based federal learning, and suitable for a case where the data samples of different participants overlap to a large extent, but the overlap degree of sample features is not high. In the relevant art, vertical federal learning needs to perform sample alignment in advance, namely, find a user intersection of the participants; however, for each participant, it can learn from the user intersection that the other participant also has data of these users in the intersection, thereby learning what user information the other participant has; therefore, the user intersection might cause information leakage, thereby reducing the data security in the joint learning process.

In the present disclosure, a target identification information union set may be built first, and both the active participant and the passive participant may obtain the target identification information union set, and respectively determine respective sample data based on the target identification information union set. The target identification information union set comprises target encryption identification information of the active participant and target encryption identification information of the passive participant; the target encryption identification information in the target identification information union set is obtained by encrypting according to a key of the active participant and a key of the passive participant; since the active participant cannot learn the key of the passive participant, and the passive participant also cannot learn the key of the active participant, the identification information is simultaneously encrypted according to the keys of both participants so that one participant cannot learn the original identification information of the other participant therefrom, thereby avoiding the phenomenon of information leakage.

Figure 2:
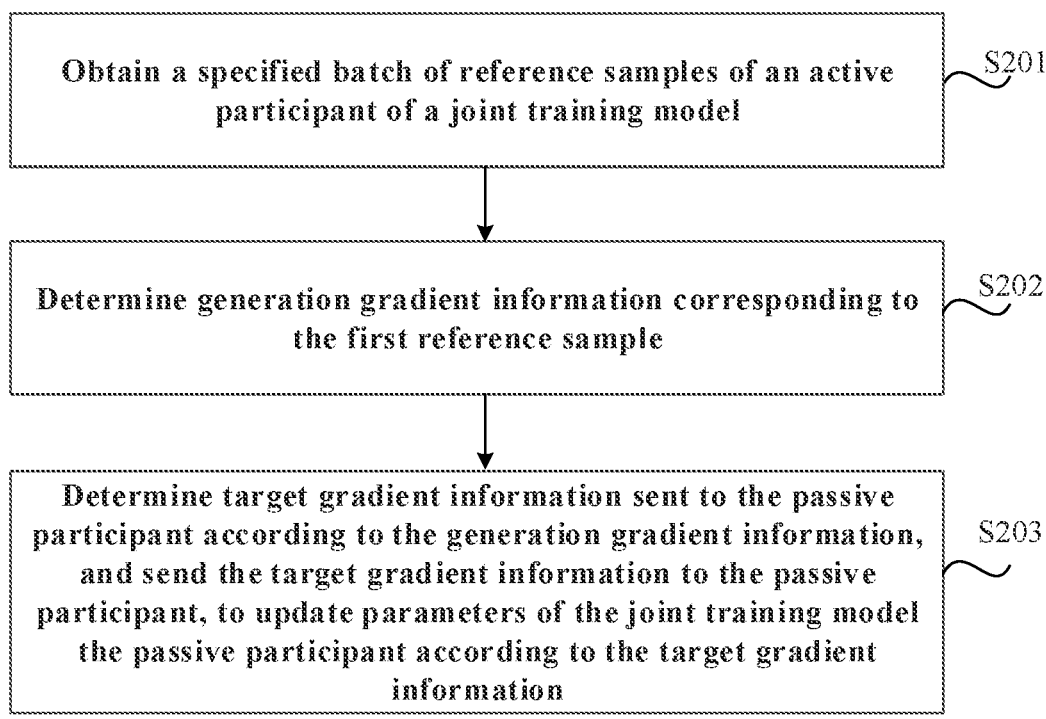
FIG. 2 is a flow chart illustrating a data protection method according to an exemplary embodiment.

FIG. 2 is a flow chart illustrating a data protection method according to an exemplary embodiment. The method may be applied to the active participant of a joint training model, for example, the active participant 101 shown in FIG. 1. As shown in FIG. 2, the method may comprise S201 through S203.

In S201, a specified batch of reference samples of an active participant in a joint training model is obtained.

The specified batch of reference samples of the active participant include a first reference sample and a second reference sample, target encryption identification information corresponding to the first reference sample is not target encryption identification information of the active participant, target encryption identification information corresponding to the second reference sample is target encryption identification information of the active participant, and the target encryption identification information is obtained by encrypting according to a key of the active participant and a key of the passive participant of the joint training model.

When the joint training model is trained, the training is usually performed in batches; different sample data are used for training in different batches; in the training process of the same batch, the target encryption identification information corresponding to the sample data respectively employed by the active participant and the passive participant is the same, and both participants may agree in advance the sample data corresponding to which target encryption identification information is employed in a batch.

The target encryption identification information is the target encryption identification information of the active participant, and may characterizes that the active participant has the original identification information corresponding to the target encryption identification information, namely, for the second reference sample, the active participant may provide actual label information and actual gradient information. The target encryption identification information is not the target encryption identification information of the active participant, and may characterize that the active participant does not have the original identification information corresponding to the target encryption identification information; and the active participant needs to provide generation label information or generation gradient information.

Exemplarily, the specified batch of reference samples of the active participant include sample 1, sample 2, sample 3 and sample 4, wherein the target encryption identification information corresponding to sample 1 is not the target encryption identification information of the active participant; the target encryption identification information respectively corresponding to sample 2, sample 3 and sample 4 are all the target encryption identification information of the active participant; then sample 1 is the first reference sample, and sample 2, sample 3 and sample 4 are the second reference samples. This example is merely illustrative, and the number of first reference sample and the number of second reference samples are not limited in the present disclosure. There may be one or more first reference samples and one or more second reference samples.

In S202, generation gradient information of the first reference sample is determined.

Since the target encryption identification information corresponding to the first reference sample is not the target encryption identification information of the active participant, the active participant cannot provide the actual gradient information of the first reference sample, so it is necessary to determine the generation gradient information about the first reference sample. In order to avoid the influence of the generated data on the model training and the model performance as much as possible, and in order to prevent the passive participant from recognizing which is the actual gradient information and which is the generation gradient information, in the present disclosure the generation gradient information may be determined according to at least one of the following information items: actual gradient information of the second reference sample, generation label information of the first reference sample, and feature information of a specified batch of reference samples of the passive participant.

The active participant may directly construct the generation gradient information of the first reference sample without generating the generation label information of the first reference sample, namely, determining the generation gradient information of the first reference sample according to the actual gradient information of the second reference sample, so that a mean value of the generation gradient information is consistent with a mean value of the actual gradient information. As such, when the joint training model is trained, the influence of the generated data on the model performance is avoided as much as possible.

The active participant may also first determine the generation label information of the first reference sample, and then calculate corresponding generation gradient information according to the generation label information of the first reference sample, so that the problem that the generated data may be recognized by the passive participant when the generation gradient information is directly constructed may be avoided, and the privacy and security of data may be improved.

In a specified batch of reference samples, if the target encryption identification information corresponding to the reference sample is the target encryption identification information of the passive participant, the passive participant may provide actual feature information of the reference sample; if the target encryption identification information corresponding to the reference sample is not the target encryption identification information of the passive participant, the passive participant may provide generation feature information of the reference sample. During the training of the joint training model, the passive participant may send the feature information (embedding) of the batch of reference samples, i.e., respective embedding of sample 1, sample 2, sample 3 and sample 4 to the active participant. The generation gradient information of the first reference sample may be determined according to the feature information of the specified batch of reference samples of the passive participant, and the generation gradient information may be determined according to a data distribution of the actual feature information and the generation feature information, to avoid the influence of the generated data on the model performance as much as possible.

In S203, target gradient information to be sent to the passive participant is determined based on the generation gradient information and sent to the passive participant, to update, by the passive participant, parameters of the joint training model according to the target gradient information.

The generation gradient information of the first reference sample and the actual gradient information of the second reference sample may be combined into a matrix form, and regarded as the target gradient information to be sent to the passive participant; the active participant may transmit the target gradient information back to the passive participant, and the passive participant may update the parameters of the joint training model according to the target gradient information.

With the above-mentioned technical solution, on the one hand, the target encryption identification information is obtained by encrypting according to the key of the active participant and the key of the passive participant of the joint training model; meanwhile, the identification information is encrypted according to the keys of both participants, so that one participant cannot learn the original identification information of the other participant therefrom, thereby avoiding the phenomenon of information leakage. On the other hand, the target encryption identification information corresponding to the first reference sample is not the target encryption identification information of the active participant; the generation gradient information of the first reference sample may be determined according to at least one of the following information items: the actual gradient information of the second reference sample, the generation label information of the first reference sample, and the feature information of the designated batch of reference samples of the passive participant. As such, the influence of the generated data on the training process and model performance of the joint training model may be avoided as much as possible, the passive participant may be prevented from recognizing the generation gradient information therein as much as possible, and the privacy and security of data may be improved.

Several exemplary embodiments for determining the generation gradient information of the first reference sample are described below.

Figure 3:
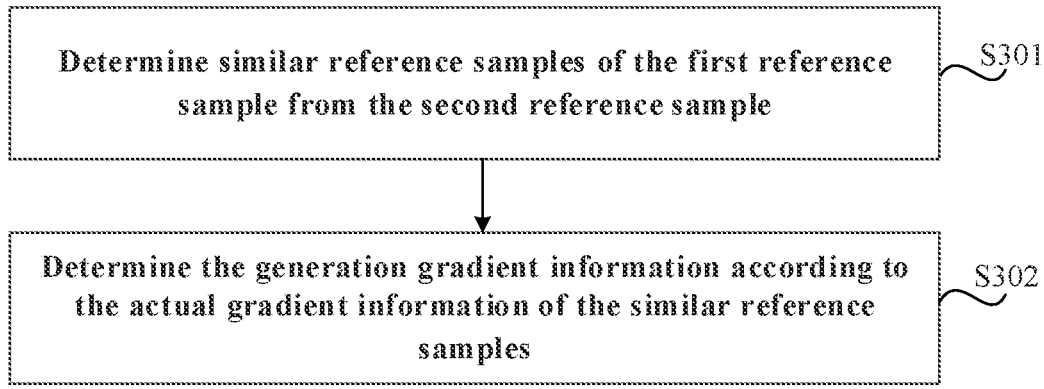
FIG. 3 is a flow chart illustrating a method of determining generation gradient information of a first reference sample according to an exemplary embodiment.

Embodiment 1: the generation gradient information may be determined according to the actual gradient information of the second reference sample, and accordingly, the implementation mode of determining the generation gradient information of the first reference sample in S202 may be as shown in FIG. 3, and includes S301 and S302.

In S301, a similar reference sample of the first reference sample is determined from the second reference sample.

In one embodiment, the second reference sample may be randomly sampled as the similar reference sample of the first reference sample.

In another embodiment, the similar reference samples of the first reference sample may be determined according to a distance between the feature information; in the present embodiment, first, for each second reference sample, distance information between the feature information of the second reference sample and the feature information of the first reference sample is determined.

The distance information may, for example, be a Euclidean distance between the feature information, and smaller distance information may characterize a higher degree of similarity between two feature information. Following the above example, for example, distance information between the feature information of the sample 2 and the feature information of the sample 1, distance information b between the feature information of the sample 3 and the feature information of the sample 1, and the distance information c between the feature information of the sample 4 and the feature information of the sample 1 may be determined, respectively.

Then, the distance information is traversed in an ascending order;

If the number of the second reference samples which correspond to currently-traversed distance information and are already taken as similar reference samples of other first reference samples is smaller than a first preset number threshold, the second reference samples corresponding to the currently-traversed distance information are taken as the similar reference samples of the first reference sample;

The traversing is stopped if one of the following conditions is satisfied: the traversing of the distance information is completed, and the determined number of similar reference samples of the first reference sample reaches a second preset number threshold.

The first preset number threshold and the second preset number threshold may both be preset. The first preset number threshold is used for limiting the number of the second reference samples as similar reference samples, namely, the second reference samples may at most serve as the first preset number threshold of similar reference samples of the first reference sample, and the second preset number threshold may be used for limiting the number of the similar reference samples of the first reference samples, namely, the first reference sample at most have the second preset number threshold of similar reference samples.

Illustratively, for example, the number of the second reference samples in the specified batch of reference samples is $n_r$, the number of the first reference samples in the specified batch of reference samples is $n_f$, the first preset number threshold is $k_r$, and the second preset number threshold is $k_f$, and the relationship between $k_r$ and $k_f$ may be expressed by the following Equation (1).

$$k_r = \left\lceil k_f \frac{n_f}{n_r} \right\rceil \tag{1}$$

As an example, the distance information is distance information a, distance information b and distance information c in an ascending order; if the number of the second reference sample (i.e., sample 2) which correspond to distance information a and are already taken as similar reference samples of other first reference samples is smaller than $K_r$, samples 2 may be regarded as the similar reference samples of sample 1; if the number of the similar reference samples of sample 1 determined at this time does not reach a second preset number threshold, the traversing will be continued to distance information b, and determination is made as to whether the sample 3 corresponding to the distance information b can be taken as the similar reference sample of sample 1.

In S302, generation gradient information is determined based on actual gradient information of similar reference samples.

Figure 4:
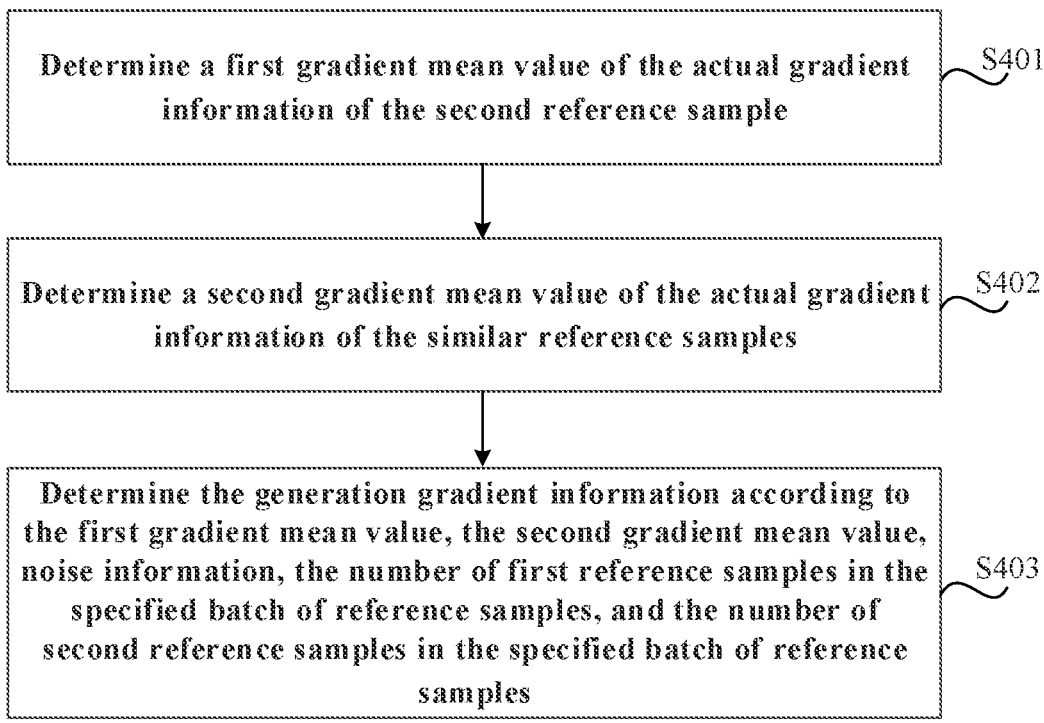
FIG. 4 is a flowchart illustrating a method of generating gradient information according to actual gradient information of similar reference samples, according to an exemplary embodiment.

Exemplary embodiments of Step S302 may be as shown in FIG. 4, including S401 through S403.

In S401, a first gradient mean value of the actual gradient information of the second reference sample is determined.

The target encryption identification information corresponding to the second reference sample is the target encryption identification information of the active participant; the active participant may provide the actual gradient information of the second reference sample; further referring to the above example, the mean value of the actual gradient information of sample 2, sample 3 and sample 4 may be taken as the first gradient mean value.

In S402, a second gradient mean value of the actual gradient information of similar reference samples is determined.

For example, if the sample 2 and the sample 3 are regarded as similar reference samples of the first reference sample (i.e., the sample 1), the mean value of the actual gradient information of sample 2 and sample 3 may be determined as the second gradient mean value.

In S403, the generation gradient information is determined based on the first gradient mean value, the second gradient mean value, noise information, the number of the first reference sample in the specified batch of reference samples, and the number of the second reference samples in the specified batch of reference samples.

Exemplarily, the generation gradient information may be determined by the following Equation (2):

$$g_f^i = n_r \left( \frac{\alpha}{n_f} g_r + \frac{(1-\alpha)}{n_r} g_n^i \right) + \varepsilon^i \tag{2}$$

where i represents the $i^{th}$ first reference sample in the specified batch of reference samples, $g_f^i$ represents generation gradient information of the $i^{th}$ first reference sample; $n_r$ represents the number of second reference samples in the specified batch of reference samples; $n_f$ represents the number of first reference samples in the specified batch of reference samples, $\bar{g}_r$ represents the first gradient mean value, $\bar{g}_n^i$ represents the second gradient mean value, $\alpha$ represents a preset parameter, and a range of the value of $\alpha$ is [0, 1], and $\varepsilon^i$ represents noise information.

The sum of the respective generation gradient information of the $n_f$ first reference samples is shown by the following Equation (3):

$$\sum_{i=1}^{n_f} g_f^i = \sum_{i=1}^{n_f} n_r \left( \frac{\alpha}{n_f} \bar{g}_r + \frac{(1-\alpha)}{n_r} \bar{g}_n^i \right) + \varepsilon^i \quad (3)$$

Since $$\sum_{j=1}^{n_f} \frac{\alpha}{n_f} \bar{g}_r = \alpha \bar{g}_r, \text{ and } \sum_{i=1}^{n_f} \frac{(1-\alpha)}{n_r} \bar{g}_n^i = (1-\alpha) \bar{g}_r, \sum_{i=1}^{n_f} g_f^i = n_r \bar{g}_r,$$

that is, the mean value of the generation gradient information of the first reference samples is consistent with the mean value of the actual gradient information of the second reference samples.

Table 1 below shows a test effect of a manner of determining generation gradient information of the first reference sample according to the actual gradient information of the second reference samples in the embodiments. As shown in Table 1, AUC, namely, Area Under Curve, is used to characterize a model evaluation index, missing_ratio represents a proportion of the number of the first reference samples to the number of the specified batch of reference samples, baseline represents a standard model evaluation index, and global_real_avg1, global_real_avg2, and global_real_avg3 represent model evaluation indices in a case where the present embodiment is used to determine the generation gradient information, wherein global_real_avg1, global_real_avg2 and global_real_avg3 respectively correspond to different network layer numbers of the model; for example, global_real_avg1 is tested in a case where the model of the passive participant has two network layers and the model of the active participant has two network layers; and global_real_avg2 is tested in a case where the model of the passive participant has three network layers and the model of the active participant has one network layer. It may be seen from Table 1 that, regardless of the proportion of the first reference samples and the change in the network layer number or the model, there is a small difference between the model evaluation index and the standard model evaluation index in the case where the present embodiment is used to the generation gradient information, so that it is ensured that the influence of generated data on the model performance may be avoided as much as possible when the joint training model is trained.

TABLE 1

|     | missing_ratio | global_real_avg1 | global_real_avg2 | global_real avg3 | baseline |
|-----|---------------|------------------|------------------|------------------|----------|
| AUC | 0.1           | 0.77829          | 0.778094         | 0.77845          | 0.778912 |
|     | 0.5           | 0.772371         | 0.771874         | 0.772612         | 0.773912 |
|     | 0.95          | 0.730877         | 0.716184         | 0.696354         | 0.745297 |

By means of the above solution, the similar reference samples of the first reference samples are determined from the second reference samples, and the generation gradient information of the first reference samples is determined according to the actual gradient information of the similar reference samples, so that the mean value of the generation gradient information of the first reference samples is consistent with the mean value of the actual gradient information of the second reference samples, such that the influence of generated data on the model performance may be ensured as much as possible when the joint training model is trained.

The above manner of determining the generation gradient information of the first reference samples is that the active participant directly constructs the generation gradient information according to the actual gradient information of the second reference samples without generating the generation label information of the first reference samples. Hereunder introduction will be given to an implementation manner of first determining the generation label information of the first reference sample, and then calculating the corresponding generation gradient information.

Embodiment 2, the generation gradient information is determined according to the generation label information of the first reference sample; accordingly, the implementation mode of determining the generation gradient information of the first reference sample in S202 may be:

setting the generation label information of the first reference sample to a preset value.

The label information may be used to characterize whether a sample is a positive case or a negative case; the positive case sample may be a sample which has achieved advertisement conversion, for example, a user clicks an advertisement or purchases an item recommended by the advertisement; the negative case sample may be a sample which has not achieved advertisement conversion; the label information of the positive case sample may be 1; the label information of the negative case sample may be 0; since the probability of advertisement conversion is small, the negative case samples account for a majority; therefore, as an example, the preset value may be 0, namely, the generation label information of the first reference sample may be set to 0 first.

Then, if the joint training model outputs first logistic regression information that feature information of the first reference sample is a positive case under a data distribution of the actual label information of the second reference sample, second logistic regression information that feature information of the first reference sample is a positive case under a data distribution of mixed label information is determined according to the first logistic regression information and a probability that the identification information corresponding to the first reference sample belongs to an identification set of the active participant; a training loss function value is determined according to the second logistic regression information, and the generation gradient information is determined according to the training loss function value.

$D_1(y=1|X=x)$ indicates that under the data distribution of the actual label information, the feature information of the first reference sample is the first logistic regression information of the positive case, X represents the feature information, x represents the feature information of the first reference sample, y=1 represents the feature information of the first reference sample is the positive case, $I_a$ represents the identification set of the active participant, $\delta_{id}^a$ represents an indication signal for indicating whether the id belongs to $I_a$, $\delta_{id}^a=1$ represents that the id belongs to $I_a$, and $\delta_{id}^a=0$ represents that the id does not belong to $I_a$, and the relationship between the first logistic regression information and the second logistic regression information is derived by the following Equation (4):

$$D'_1(y=1 \mid X=x) = \sum_{\delta_{id}^a=0}^{1} Pr[\delta_{id}^a]D'_1(y=1 \mid X=x, \delta_{id}^a) = \tag{4}$$
$$Pr[\delta_{id}^a=1]D'_1(y=1 \mid X=x, \delta_{id}^a=1) +$$
$$Pr[\delta_{id}^a=0]D'_1(y=1 \mid X=x, \delta_{id}^a=0) = p_a D_1(y=1 \mid X=x).$$

where $D'_1(y=1|X=x)$ represents second logistic regression information indicating that under the data distribution of the mixed label information, the feature information of the first reference sample is a positive case, and the mixed label information includes the actual label information and generation label information, i.e., the mixed label information is the label information after the generation label information is introduced. $P_a$ represents a probability that the identification information corresponding to the first reference sample belongs to the identification set of the active participant, and the probability may be determined according to the number of users of the active participant and the number of users of the passive participant; $P_r$ refers to the probability; it can be known from Equation (4) that according to $p_a$ and $D_1(y=1|X=x)$, the second logistic regression information $D'_1(y=1|X=x)$ may be obtained.

The training loss function value may be determined according to the second logistic regression information and the sigmoid function, and the generation gradient information of the first reference sample may be determined according to the training loss function value.

Figure 5:
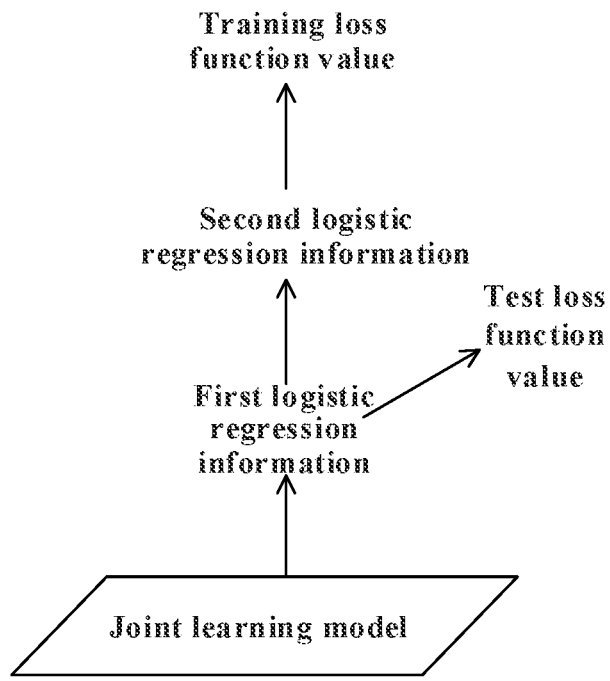
FIG. 5 is a schematic diagram illustrating a training phase and a testing phase of a model according to an exemplary embodiment.

FIG. 5 is a schematic diagram illustrating a training phase and a testing phase of a model according to an exemplary embodiment. As shown in FIG. 5, if what is output by the joint training model is the first logistic regression information under the data distribution of the actual label information, since the training loss function value needs to be obtained under the data distribution of the mixed label information, the logistic regression information is corrected in the training phase, i.e., the first logistic regression information is mapped to the second logistic regression information under the data distribution of the mixed label information, and the training loss function value is obtained according to the second logistic regression information.

In the present embodiment, the data protection method may further comprise: according to the first logistic regression information, determining a test loss function value, and testing the joint training model according to the test loss function value.

As shown in FIG. 5, in the testing phase, a test loss function value is obtained according to the first logistic regression information, and the joint training model is tested according to the test loss function value, and the model may be tested under the data distribution of the actual label information, so that the test of the model is more accurate and the model performance is more stable.

Embodiment 3, the generation gradient information is determined according to the generation label information of the first reference sample; accordingly, the implementation mode of determining the generation gradient information of the first reference sample in S202 may be:

setting the generation label information of the first reference sample to a preset value. The implementation mode of this step has been described above, and the preset value may be 0.

Then, if the joint training model outputs the second logistic regression information that the feature information of the first reference sample under the data distribution of the mixed label information is a positive case, a training loss function value is determined according to the second logistic regression information; the generation gradient information is determined based on the training loss function value. The mixed label information includes generation label information and actual label information of the second reference sample.

Figure 6:
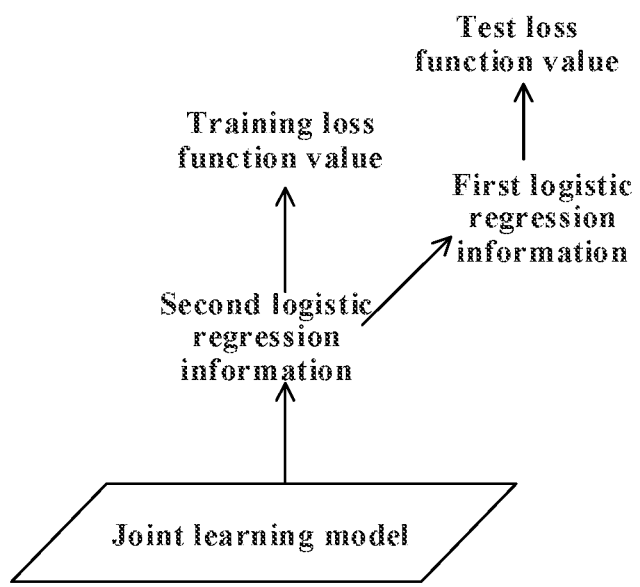
FIG. 6 is a schematic diagram illustrating a model training and testing phase according to another exemplary embodiment.

FIG. 6 is a schematic diagram illustrating a training phase and a testing phase of the model according to another exemplary embodiment. As shown in FIG. 6, if what is output by the joint training model is the second logistic regression information under the data distribution of the mixed label information, the training loss function value is determined directly according to the second logistic regression information and the sigmoid function without correcting the logistic regression information in the training phase, and the generation gradient information is obtained according to the training loss function value.

In this embodiment, the data protection method may further comprise: according to the second logistic regression information and a probability that the identification information corresponding to the first reference sample belongs to an identification set of the active participant, determining first logistic regression information that the feature information of the first reference sample is a positive case under the data distribution of the actual label information of the second reference sample; according to the first logistic regression information, a test loss function value is determined, and the joint training model is tested according to the test loss function value.

Since the model needs to be tested under the data distribution of the actual label information in the model testing phase, as shown in FIG. 6, the logistic regression information needs to be corrected in the testing phase, namely, the first logistic regression information under the data distribution of the actual label information is obtained according to the second logistic regression information. The first logistic regression information $D_1(y=1|X=x)$ may be obtained through $p_a$ and $D'_1(y=1|X=x)$ according to Equation (4), and the test loss function value is determined according to the first logistic regression information, so that the model may be tested under the data distribution of the actual label information, thereby making the test of the model more accurate.

It should be appreciated that there is no association between the training loss function value and the test loss function value, the training loss function value is used to calculate the generation gradient information for updating the parameters of the model, whereas the test loss function value is not used to calculate the gradient information but only for evaluating and testing the model.

Through the above-mentioned solution, considering that negative case samples accounts for a majority, the generation label information of the first reference sample may be set as a preset value firstly, and determination is made as to whether to correct the logistic regression information in the training phase or to correct the logistic regression information in the testing phase, to ensure that the training loss function value is obtained under the data distribution of the mixed label information so that the generation gradient information determined according to the training loss function value is more accurate, and ensure that upon testing the model, testing is performed under the data distribution of the actual label information so that the test of the model is more accurate and the performance of the model is more stable.

Embodiment 4, the generation gradient information is determined according to the generation label information of the first reference sample, and accordingly, determining the generation gradient information of the first reference sample in S202 may comprise:

determining a prediction probability that the feature information of the first reference sample is a positive case; determining generation label information of the first reference sample according to the prediction probability; determining a training loss function value according to the generation label information, and determining the generation gradient information according to the training loss function value.

In this embodiment, the generation label information of the first reference sample may be determined first; unlike the manner of setting the generation label information of the first reference sample as a preset value in the above-mentioned embodiment, the generation label information of the first reference sample may be determined according to the prediction probability that the feature information of the first reference sample is a positive case in this embodiment. The joint training model may output the prediction probability that the feature information of the first reference sample is a positive case, and then determine the generation label information according to the prediction probability and a generated random number. Exemplarily, a random number between (0, 1) may be generated, for example, the prediction probability is 0.25; if the generated random number is between (0, 0.25], the generation label information may be determined as 1; if the generated random number is between (0.25, 1), the generation label information may be determined as 0. The training loss function value may be determined based on the generation label information, and generation gradient information may be generated according to the training loss function value.

In the embodiment, the impact of the manner of determining the generation gradient information on model parameters is unbiased, i.e., $E[\nabla_w \log p(y^*_i|x_i)]=0$, where w represents the parameters of the joint training model, $y^*_i$ represents the generation label information of the $i^{th}$ first reference sample determined according to the prediction probability, and $x_i$ represents the feature information of the $i^{th}$ first reference sample. Wherein a derivation process of $E[\nabla_w \log p(y^*_i|x_i)]=0$ is as follows:

$$0 = \nabla_w \sum_{i \notin obs} \log \sum_{y_i} p(y_i|x_i) = \sum_{i \notin obs} \sum_{y_i} \nabla_w p(y_i|x_i) =$$

-continued $$\sum_{i \notin obs} \sum_{y_i} p(y_i) \frac{\nabla_w p(y_i|x_i)}{p(y_i)} = \sum_{i \notin obs} E_{p(y_i)}\left[\frac{\nabla_w p(y_i|x_i)}{p(y_i)}\right] \approx$$

$$\sum_{i \notin obs} \frac{\nabla_w p(y^*_i|x_i)}{p(y^*_i)} \nabla_w \sum_{i \notin obs} \log p(y^*_i|x_i) = \sum_{i \notin obs} \frac{\nabla_w p(y^*_i|x_i)}{p(y^*_i|x_i)}$$

where obs represents a set of users of the active participant, and $y_i$ represents the label information of the $i^{th}$ first reference sample.

Through the above-mentioned solution, the generation label information is determined according to the prediction probability that the feature information of the first reference sample is a positive case, and then the generation gradient information is determined according to the generation label information; the influence on the model parameters is unbiased, and the influence of the generated data on the model performances may be avoided as much as possible; furthermore, the manner of determining the generation gradient information may be applied to a balanced/unbalanced binary classification task and a multi-class classification task.

Embodiment 5: the generation gradient information is determined according to the feature information of a specified batch of reference samples of the passive participant, and accordingly, determining the generation gradient information of the first reference sample in S202 may comprise:

obtaining feature information of a specified batch of reference samples of the passive participant, the feature information including actual feature information and generation feature information.

In the training process of the joint training model, the passive participant sends the feature information of the specified batch of reference samples to the active participant, wherein if the target encryption identification information corresponding to the reference samples is the target encryption identification information of the passive participant, the passive participant may provide actual feature information of the reference samples; if the target encryption identification information corresponding to the reference samples is not the target encryption identification information of the passive participant, the passive participant may provide the generation feature information of the reference samples. In the present disclosure, the generation feature information in the feature information of the specified batch of reference samples of the passive participant may be determined from the actual feature information, e.g., the feature information is randomly selected from the actual feature information as the generation feature information.

Then, if the joint training model outputs third logistic regression information that the feature information of the first reference sample is a positive case under the data distribution of the actual feature information, fourth logistic regression information that the feature information of the first reference sample is a positive case under the data distribution of mixed feature information, is determined according to the third logistic regression information and a probability that the identification information corresponding to the first reference sample belong to an identification set of the passive participant; a training loss function value is determined based on the fourth logistic regression information, and the generation gradient information is determined according to the training loss function value.

$D_2(y=1|X=x)$ represents the third logistic regression information indicating that the feature information of the first reference sample is a positive case under the data distribution of the actual feature information, $I_p$ represents the identification set of the passive participant, $\delta_{id}^p$ represents an indication signal for indicating whether id belongs to $I_p$, $\delta_{id}^p=1$ represents that id belongs to $I_p$, $\delta_{id}^p=0$ represents that id does not belong to $I_p$, and the relationship between the third logistic regression information and the fourth logistic regression information is derived by the following Equation (5):

$$D'_2(y=1\mid X=x) = \sum_{\delta_{id}^p=0}^{1} Pr[\delta_{id}^p]D'_2(y=1\mid X=x, \delta_{id}^p) = \quad (5)$$

$$Pr[\delta_{id}^p=1]D'_2(y=1\mid X=x, \delta_{id}^p=1) + Pr[\delta_{id}^p=0]$$

$$D'_2(y=1\mid X=x, \delta_{id}^p=0) = p_p D_2(y=1\mid X=x) + (1-p_p)D(y=1).$$

where $D'_2(y=1|X=x)$ represents the fourth logistic regression information indicating that the feature information of the first reference sample is a positive case under the data distribution of the mixed feature information, and the mixed feature information includes the actual feature information and the generation feature information, i.e., the feature information after the generation feature information is introduced. $p_p$ represents the probability that the identification information corresponding to the first reference sample belongs to the identification set of the passive participant, and D(y=)I represents a marginal distribution estimation of the actual label information; as known from Equation (5), the fourth logistic regression information $D'_2(y=1|X=x)$ may be obtained according to $p_p$ and $D_2(y=1|X=x)$.

The training loss function value may be determined according to the fourth logistic regression information and the sigmoid function, and generation gradient information of the first reference sample may be determined according to the training loss function value.

Since what is output by the joint training model is the third logistic regression information under the data distribution of the actual feature information, and the training loss function value needs to be obtained under the data distribution of the mixed feature information, the logistic regression information is corrected in the training phase, i.e., the third logistic regression information is mapped to the fourth logistic regression information under the data distribution of the mixed feature information, and the training loss function value is determined according to the fourth logistic regression information.

In this embodiment, the data protection method may further comprise: determining a test loss function value according to the third logistic regression information, and testing the joint training model according to the test loss function value.

When the model is tested, in order to make the test of the model more accurate and make the model performance more stable, the model needs to be tested under the data distribution of the actual feature information, so the test loss function value is determined according to the third logistic regression information so as to test the model. The training phase and the testing phase in this embodiment may be similar to those in FIG. 5, i.e., the logistic regression information is corrected during the training phase.

In the present disclosure, the generation feature information in the feature information of the specified batch of reference samples of the passive participant may be determined from the actual feature information, namely, the actual feature information may be sampled randomly as the generation feature information. The reason why determining the generation feature information from the actual feature information can ensure data privacy is explained as follows, and a derivation process is as shown in Equation (6):

$$\begin{aligned}
\operatorname*{argmin}_{D'} KL(D\|D') &= \operatorname*{argmin}_{p\in\Delta_x} \int_{x,y} D(x,y)\log\frac{D(x,y)}{p(x)q(y)}dxdy \quad (6) \\
&= \operatorname*{argmax}_{p\in\Delta_x} \int_{x,y} D(x,y)\log p(x)q(y)dxdy \\
&= \operatorname*{argmax}_{p\in\Delta_x}\left(\int_{x,y} D(x,y)\log p(x)dxdy + \int_{x,y} D(x,y)\log q(y)dxdy\right) \\
&= \operatorname*{argmax}_{p\in\Delta_x}\left(\int_x\left(\int_y D(x,y)\right)\log p(x)dy\right)dx \\
&= \operatorname*{argmin}_{p\in\Delta_x} - \int_x p^*(x)\log p(x)dx \\
&= \operatorname*{argmin}_{p\in\Delta_x} \int_x p^*(x)\log\frac{p^*(x)}{p(x)}dx \\
&= \operatorname*{argmin}_{p\in\Delta_x} KL(p^*(x)\|p(x))
\end{aligned}$$

where D(x, y) represents the data distribution of the actual label information and the actual feature information, x represents the feature information, y represents the label information, D is a short form of D(x, y), D' represents the data distribution of the generation label information and the generation feature information, KL represents a distance function, p represents a probability density function, ΔX represents a set of the probability density functions, p represents one of ΔX, p(x) represents the data distribution of the actual feature information, q(y) represents the data distribution of the label information, and p*(x) represents the data distribution of the generation feature information.

As known from Equation (6), when p(x) is equal to p*(x), a distance between D and D' is the smallest, namely, determining the generation feature information from the actual feature information makes the data distribution of the actual label information and the actual feature information be closest to the data distribution of the generation label information and the generation feature information, can avoid the problem that the generation feature information is identified as much as possible, and ensure data privacy.

Embodiment 6: the generation gradient information is determined according to the feature information of a specified batch of reference samples of the passive participant, and accordingly, determining the generation gradient information of the first reference sample in S202 may comprise:

obtaining feature information of the specified batch of reference samples of the passive participant, the feature information including actual feature information and generation feature information. Embodiments of this step have been described above.

Then, if the joint training model outputs fourth logistic regression information that the feature information of the first reference sample is a positive case under the data distribution of the mixed feature information, a training loss function value is determined according to the fourth logistic regression information; the generation gradient information is determined according to the training loss function value.

If what is output by the joint training model is the fourth logistic regression information under the data distribution of the mixed feature information, it is not necessary to correct the logistic regression information in the training phase, and the training loss function value is directly determined according to the fourth logistic regression information and the sigmoid function, and the generation gradient information is obtained according to the training loss function value.

In this embodiment, the data protection method may further comprise: according to the fourth logistic regression information and a probability that the identification information corresponding to the first reference sample belongs to an identification set of the passive participant, determining third logistic regression information that the feature information of the first reference sample is a positive case under the data distribution of the actual feature information; determining a test loss function value according to the third logistic regression information, and testing the joint training model according to the test loss function value.

Since when the model is tested, it needs to be tested under the data distribution of the actual feature information, if what is output by the model is the fourth logistic regression information under the data distribution of the mixed feature information, the logistic regression information needs to be corrected in the testing phase, wherein the third logistic regression information $D_2(y=1|X=x)$ may be obtained through $p_p$ and $D'_2(y=1|X=x)$ according to Equation (5), and the test loss function value may be determined according to the third logistic regression information to test the model. The training phase and the testing phase of the model in this embodiment may be similar to FIG. 6, i.e., the logistic regression information is corrected during the testing phase.

By the above-mentioned solution, it is ensured that the training loss function value is obtained under the data distribution of mixed feature information so that the generation gradient information determined according to the training loss function value is more accurate, and it is also ensured that when a model is tested, it is tested under the data distribution of actual feature information, so that the test of the model is more accurate and the model performance is more stable.

Embodiment 7: the generation gradient information is determined according to the generation label information of the first reference sample and the feature information of the specified batch of reference samples of the passive participant, and accordingly, determining the generation gradient information of the first reference sample in S202 may comprise:

setting the generation label information of the first reference samples as a preset value;

obtaining feature information the specified batch of reference samples of the passive participant, wherein the feature information may include actual feature information and generation feature information.

wherein the preset value may be for example 0, i.e., the generation label information of the first reference samples is all set to 0 first. The generation feature information may be randomly selected from the actual feature information, as described above.

Then, if the joint training model outputs fifth logistic regression information that the feature information of the first reference sample is a positive case under the data distribution of the actual label information of the second reference sample and the actual feature information, determining sixth logistic regression information that the feature information of the first reference sample is a positive case under the data distribution of mixed feature information and mixed label information, according to the fifth logistic regression information, a probability that the identification information corresponding to the first reference sample belongs to an identification set of the active participant and a probability that the identification information corresponding to the first reference sample belongs to an identification set of the passive participant; a training loss function value is determined according to the sixth logistic regression information, and generation gradient information is determined according to the training loss function value.

$D_3(y=1|X=x)$ represents the fifth logistic regression information that the feature information of the first reference sample is a positive case under the data distribution of the actual label information of the second reference sample and the actual feature information; a relationship between the fifth logistic regression information and the sixth logistic regression information may be derived by the following Equation (7):

$$D'_3(y=1 \mid X=x) = \sum_{\delta^a_{id}=0}^{1} \sum_{\delta^p_{id}=0}^{1} Pr[\delta^a_{id}, \delta^p_{id}]D'_3(y=1 \mid X=x, \delta^a_{id}, \delta^p_{id}) = \qquad (7)$$

$$Pr[\delta^a_{id}=1, \delta^p_{id}=1]D'_3(y=1 \mid X=x, \delta^a_{id}=1, \delta^p_{id}=1) +$$
$$Pr[\delta^a_{id}=1, \delta^p_{id}=0]D'_3(y=1 \mid X=x, \delta^a_{id}=0, \delta^p_{id}=0) =$$
$$p_a p_p D_3(y=1 \mid X=x) + p_a(1-p_p)D_3(y=1).$$

where $D'_3(y=1|X=x)$ represents the sixth logistic regression information that the feature information of the first reference sample is a positive case under the data distribution of mixed feature information and mixed label information; it may be known from Equation (7) that the sixth logistic regression information $D'_3(y=1|X=x)$ may be obtained according to $D_3(y=1|X=x)$, the probability $p_a$ that the identification information corresponding to the first reference sample belongs to an identification set of the active participant and the probability $p_p$ that the identification information corresponding to the first reference sample belongs to an identification set of the passive participant.

A training loss function value may be determined according to the sixth logistic regression information and the sigmoid function, and generation gradient information of the first reference sample may be determined according to the training loss function value.

Since the training loss function value needs to be obtained under the data distribution of mixed feature information and mixed label information, logistic regression information is corrected in the training phase, namely, the sixth logistic regression information is obtained according to the fifth logistic regression information, so that the training loss function value is determined according to the sixth logistic regression information.

In this embodiment, the data protection method may further comprise: determining a test loss function value according to the fifth logistic regression information, and testing the joint training model according to the test loss function value.

When the model is tested, in order to make the test of the model more accurate and make the model performance more stable, the model needs to be tested under the data distribution of the actual label information and the actual feature information, so the test loss function value is determined according to the fifth logistic regression information so as to test the model. The training phase and the testing phase in this embodiment may be similar to those in FIG. 5, i.e., the logistic regression information is corrected during the training phase.

Embodiment 8: the generation gradient information is determined according to the generation label information of the first reference sample and the feature information of a specified batch of reference samples of the passive participant; accordingly, the implementation mode of determining the generation gradient information of the first reference sample in S202 may be:

setting the generation label information of the first reference sample as a preset value;

obtaining feature information of a specified batch of reference samples of the passive participant, wherein the feature information includes actual feature information and generation feature information;

wherein the preset value may be for example 0, i.e., the generation label information of the first reference samples is all set to 0 first. The generation feature information may be randomly selected from the actual feature information, as described above.

Then, if the joint training model outputs sixth logistic regression information that the feature information of the first reference sample is a positive case under the data distribution of the mixed feature information and the mixed label information, a training loss function value is determined according to the sixth logistic regression information; the generation gradient information is determined according to the training loss function value.

If what is output by the joint training model is the sixth logistic regression information under the data distribution of the mixed feature information and the mixed label information, it is unnecessary to correct the logistic regression information in the training phase, and the training loss function value is determined directly according to the sixth logistic regression information and the sigmoid function, and the generation gradient information is obtained according to the training loss function value.

In this embodiment, the data protection method may further comprise: determining fifth logistic regression information that the feature information of the first reference sample is a positive case under the data distribution of the actual label information of the second reference sample and the actual feature information, according to the sixth logistic regression information, a probability that the identification information corresponding to the first reference sample belongs to an identification set of the active participant and a probability that the identification information corresponding to the first reference sample belongs to an identification set of the passive participant; determining a test loss function value according to the fifth logistic regression information, and testing the joint training model according to the test loss function value.

Since the model needs to be tested under the data distribution of the actual feature information and the actual label information, if what is output by the model is the sixth logistic regression information under the data distribution of the mixed feature information and the mixed label information, the logistic regression information needs to be corrected in the testing phase, wherein the fifth logistic regression information $D_3(y=1|X=x)$ may be obtained through $D'_3(y=1|X=x)$, $p_a$ and $p_p$, and the test loss function value is determined according to the fifth logistic regression information to test the model. The training phase and the testing phase of the model in this embodiment may be similar to FIG. 6, i.e., the logistic regression information is corrected during the testing phase of the model.

In the above-mentioned Embodiments 7 and 8, both the active participant and the passive participant need to provide generation data, i.e., the active participant provides the generation label information, and the passive participant provides the generation feature information; the following Table 2 shows a test effect of a manner in which both the active participant and the passive participant provide the generation data, wherein A represents a proportion of the generation label information of the active participant to total label information, and B represents a proportion of the generation feature information of the passive participant to the total feature information; the test is performed in a case where A=B, 0.05, 0.1, 0.25, 0.5, 0.6, 0.75, 0.8, 0.9 and 0.95 represent proportions of generated data, and ΔAUC is used to characterize a change rate of a model evaluation index compared with a standard model evaluation index in a case where the embodiment is used to determine the generation gradient information. As can be seen from Table 2, the model evaluation index after the introduction of the generated data has a small amount of change compared with the standard model evaluation index, i.e., the impact on the model performances is small.

TABLE 2

| A = B | 0.05 | 0.1 | 0.25 | 0.5 | 0.6 | 0.75 | 0.8 | 0.9 | 0.95 |
|---|---|---|---|---|---|---|---|---|---|
| Δ AUC | −0.076% | −0.165% | −0.408% | −1.259% | −1.707% | −3.081% | −3.566% | −4.924% | −5.119% |

By the above-mentioned solution, it is ensured that the training loss function value is obtained under the data distribution of mixed label information and mixed feature information, so that the generation gradient information determined according to the training loss function value is more accurate, and it is also ensured that when a model is tested, it is tested under the data distribution of actual label information and actual feature information, so that the test of the model is more accurate and the model performance is more stable.

Figure 7:
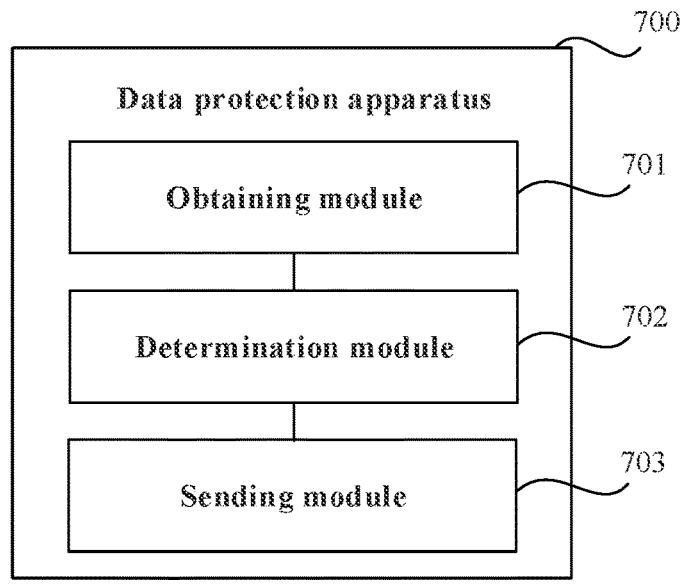
FIG. 7 is a block diagram of a data protection apparatus according to an exemplary embodiment.

Based on the same inventive concept, the present disclosure further provides a data protection apparatus. FIG. 7 is a block diagram of a data protection apparatus according to an exemplary embodiment. As shown in FIG. 7, the apparatus 700 may comprise: an obtaining module 701 for obtaining a specified batch of reference samples of an active participant of a joint training model, wherein the specified batch of reference samples of the active participant includes a first reference sample and a second reference sample, target encryption identification information corresponding to the first reference sample is not target encryption identification information of the active participant, target encryption identification information corresponding to the second reference sample is target encryption identification information of the active participant, and the target encryption identification information is obtained by encrypting according to a key of the active participant and a key of a passive participant of the joint training model; a determination module 702 for determining generation gradient information of the first reference sample, wherein the generation gradient information is determined according to at least one of the following information items: actual gradient information of the second reference sample, generation label information of the first reference sample, and feature information of a specified batch of reference samples of the passive participant; a sending module 703 for determining the target gradient information sent to the passive participant according to the generation gradient information, and sending the target gradient information to the passive participant, to update, by the passive participant, parameters of the joint training model according to the target gradient information.

Optionally, the generation gradient information is determined according to the actual gradient information of the second reference sample; the determination module 702 comprises: a similar reference sample determination sub-module for determining similar reference samples of the first reference sample from the second reference sample; a gradient information determination sub-module for determining the generation gradient information according to the actual gradient information of the similar reference samples.

Optionally, the similar reference sample determination sub-module comprises: a distance information determination sub-module for determining, for each of the second reference samples, distance information between the feature information of the second reference sample and the feature information of the first reference sample; a first traversal sub-module for traversing the distance information in an ascending order; a first determination sub-module for, if the number of the second reference samples which correspond to currently-traversed distance information and are already taken as similar reference samples of other first reference samples is smaller than a first preset number threshold, taking the second reference samples corresponding to the currently-traversed distance information as the similar reference samples of the first reference sample; a second traversal sub-module for stopping the traversing if one of the following conditions is satisfied: the traversing of the distance information is completed, and the determined number of similar reference samples of the first reference sample reaches a second preset number threshold.

Optionally, the gradient information determination sub-module comprises: a first gradient mean value determination sub-module for determining a first gradient mean value of the actual gradient information of the second reference sample; a second gradient mean value determination sub-module for determining a second gradient mean value of the actual gradient information of the similar reference samples; a second determination sub-module for determining the generation gradient information according to the first gradient mean value, the second gradient mean value, noise information, the number of first reference samples in the specified batch of reference samples, and the number of second reference samples in the specified batch of reference samples.

Optionally, the second determining sub-module is used for determining the generation gradient information by the following equation:

$$g_f^i = n_r\left(\frac{\alpha}{n_f}\bar{g}_r + \frac{(1-\alpha)}{n_r}\bar{g}_n^i\right) + \varepsilon^i$$

where i represents the $i^{th}$ first reference sample in the specified batch of reference samples, $g_f^i$ represents generation gradient information of the $i^{th}$ first reference sample; $n_r$ represents the number of second reference samples in the specified batch of reference samples; $n_f$ represents the number of first reference samples in the specified batch of reference samples, $\bar{g}_r$ represents the first gradient mean value, $\bar{g}_n^i$ represents the second gradient mean value, $\alpha$ represents a preset parameter, and a range of the value of $\alpha$ is [0, 1], and $\varepsilon^i$ represents noise information.

Optionally, the generation gradient information is determined according to the generation label information of the first reference sample; the determination module 702 comprises: a first setting sub-module for setting the generation label information of the first reference sample as a preset value; a third determination sub-module for, if the joint training model outputs first logistic regression information that feature information of the first reference sample is a positive case under data distribution of actual label information of the second reference sample, determining second logistic regression information that the feature information of the first reference sample is a positive case under data distribution of mixed label information, according to the first logistic regression information and a probability that the identification information corresponding to the first reference sample belongs to an identification set of the active participant, wherein the mixed label information includes the actual label information and the generation label information; a fourth determination sub-module for determining a training loss function value according to the second logistic regression information, and determining the generation gradient information according to the training loss function value.

Optionally, the apparatus 700 further comprises: a first test module for determining a test loss function value according to the first logistic regression information, and testing the joint training model according to the test loss function value.

Optionally, the generation gradient information is determined according to the generation label information of the first reference sample; the determination module 702 comprises: a second setting sub-module for setting the generation label information of the first reference sample as a preset value; a first function value determination sub-module for, if the joint training model outputs second logistic regression information that the feature information of the first reference sample is a positive case under data distribution of the mixed label information, determining a training loss function value according to the second logistic regression information, wherein the mixed label information includes the generation label information and the actual label information of the second reference sample; a fifth determination sub-module for determining the generation gradient information according to the training loss function value.

Optionally, the apparatus 700 further comprises: a first information determination module for, according to the second logistic regression information and a probability that the identification information corresponding to the first reference sample belongs to an identification set of the active participant, determining first logistic regression information that the feature information of the first reference sample is a positive case under the data distribution of the actual label information of the second reference sample; a second test module for determining a test loss function value according to the first logistic regression information, and testing the joint training model according to the test loss function value.

Optionally, the generation gradient information is determined according to the generation label information of the first reference sample; the determination module 702 comprises: a prediction probability determination sub-module for determining a prediction probability that the feature information of the first reference sample is a positive case; a label information determination sub-module for determining generation label information of the first reference sample according to the prediction probability; a sixth determination sub-module for determining a training loss function value according to the generation label information, and determining the generation gradient information according to the training loss function value.

Optionally, the generation gradient information is determined according to feature information of a specified batch of reference samples of the passive participant; the determination module 702 comprises: a first acquisition sub-module for obtaining feature information of a specified batch of reference samples of the passive participant, the feature information including actual feature information and generation feature information; a seventh determination sub-module for, if the joint training model outputs third logistic regression information that the feature information of the first reference sample is a positive case under the data distribution of the actual feature information, determining fourth logistic regression information that under the data distribution of mixed feature information, the feature information of the first reference sample is a positive case according to the third logistic regression information and a probability that the identification information corresponding to the first reference sample belong to an identification set of the passive participant, wherein the mixed feature information includes the actual feature information and the generation feature information; an eighth determination sub-module for determining a training loss function value according to the fourth logistic regression information, and determining the generation gradient information according to the training loss function value.

Optionally, the apparatus 700 further comprises: a third test module for determining a test loss function value according to the third logistic regression information, and testing the joint training model according to the test loss function value.

Optionally, the generation gradient information is determined according to feature information of a specified batch of reference samples of the passive participant; the determination module 702 comprises: a second acquisition sub-module for obtaining feature information of a specified batch of reference samples of the passive participant, the feature information including actual feature information and generation feature information; a second function value determination sub-module for, if the joint training model outputs fourth logistic regression information that the feature information of the first reference sample is a positive case under the data distribution of mixed feature information, determining a training loss function value according to the fourth logistic regression information, wherein the mixed feature information includes the actual feature information and the generation feature information; a ninth determination sub-module for determining the generation gradient information according to the training loss function value.

Optionally, the apparatus 700 further comprises: a second information determination module for, according to the fourth logistic regression information and a probability that the identification information corresponding to the first reference sample belongs to an identification set of the passive participant, determining third logistic regression information that under data distribution of the actual feature information, the feature information of the first reference sample is a positive case; a fourth test module for determining a test loss function value according to the third logistic regression information, and testing the joint training model according to the test loss function value.

Optionally, the generation gradient information is determined according to the generation label information of the first reference sample and feature information of a specified batch of reference samples of the passive participant; the determination module 702 comprises: a third setting sub-module for setting the generation label information of the first reference sample as a preset value; a third acquisition sub-module for obtaining feature information of a specified batch of reference samples of the passive participant, wherein the feature information includes actual feature information and generation feature information; a tenth determination sub-module for, if the joint training model outputs fifth logistic regression information that the feature information of the first reference sample is a positive case under data distribution of the actual label information of the second reference sample and the actual feature information, determining sixth logistic regression information that the feature information of the first reference sample is a positive case under data distribution of mixed feature information and mixed label information, according to the fifth logistic regression information, a probability that the identification information corresponding to the first reference sample belongs to an identification set of the active participant and a probability that the identification information corresponding to the first reference sample belongs to an identification set of the passive participant, wherein the mixed label information includes the generation label information and actual label information of the second reference sample, and the mixed feature information includes the actual feature information and the generation feature information; an eleventh determination sub-module for determining a training loss function value according to the sixth logistic regression information, and determining the generation gradient information according to the training loss function value.

Optionally, the apparatus 700 further comprises: a fifth test module for determining a test loss function value according to the fifth logistic regression information, and testing the joint training model according to the test loss function value.

Optionally, the generation gradient information is determined according to the generation label information of the first reference sample and feature information of a specified batch of reference samples of the passive participant; the determination module 702 comprises: a fourth setting sub-module for setting the generation label information of the first reference sample as a preset value; a fourth acquisition sub-module for obtaining feature information of a specified batch of reference samples of the passive participant, the feature information including actual feature information and generation feature information; a third function value determination sub-module for, if the joint training model outputs sixth logistic regression information that the feature information of the first reference sample is a positive case under data distribution of mixed feature information and mixed label information, determining a training loss function value according to the sixth logistic regression information, wherein the mixed label information includes the generation label information and the actual label information of the second reference sample, and the mixed feature information includes the actual feature information and the generation feature information; a twelfth determination sub-module for determining the generation gradient information according to the training loss function value.

Optionally, the apparatus 700 further comprises: a third information determination module for determining fifth logistic regression information that the feature information of the first reference sample is a positive case under data distribution of the actual label information of the second reference sample and the actual feature information, according to the sixth logistic regression information, a probability that the identification information corresponding to the first reference sample belongs to an identification set of the active participant and a probability that the identification information corresponding to the first reference sample belongs to an identification set of the passive participant; a sixth test module for determining a test loss function value according to the fifth logistic regression information, and testing the joint training model according to the test loss function value.

Optionally, the generation feature information in the feature information of the specified batch of reference samples of the passive participant is determined from the actual feature information.

Figure 8:
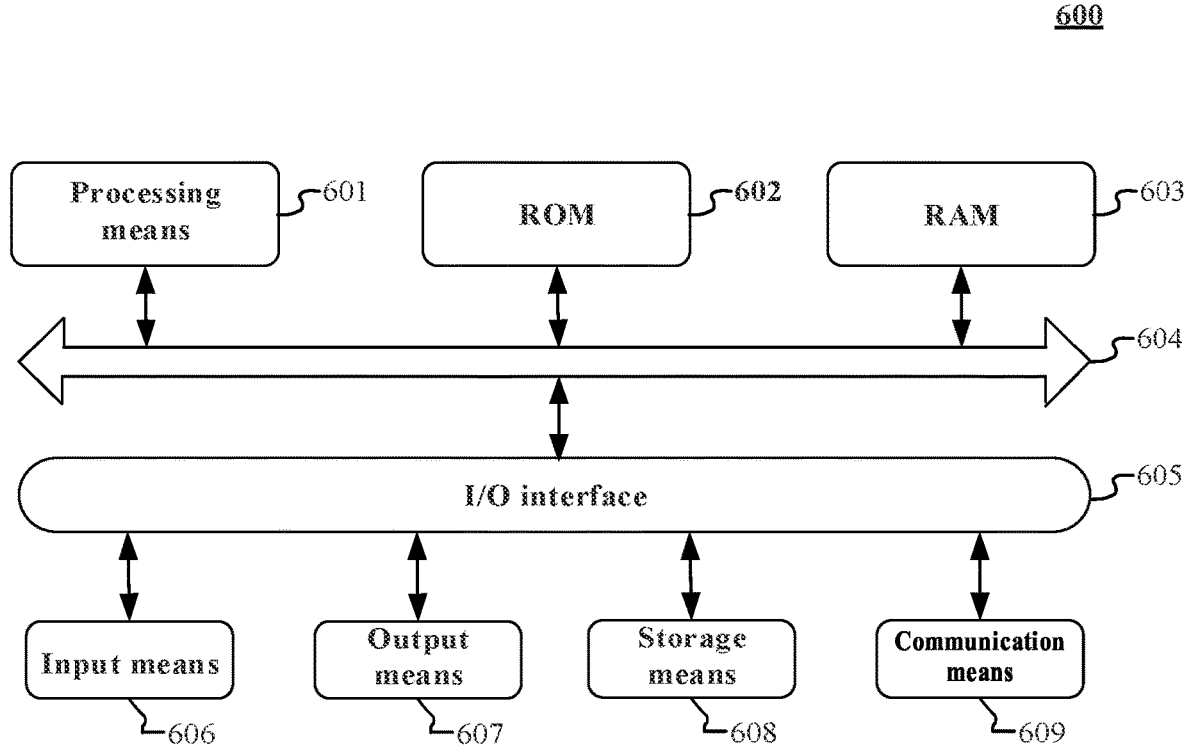
FIG. 8 shows a schematic structural diagram of an electronic device according to an embodiment of the present disclosure.

Reference is now made to FIG. 8, which illustrates a structural schematic diagram of an electronic device 600 suitable for implementing embodiments of the present disclosure. The terminals in the embodiments of the present disclosure may comprise, but are not limited to, mobile terminals such as mobile phones, notebook computers, digital broadcast receivers, PDAs (Personal Digital Assistants), PADs (Tablet Computers), PMPs (Portable Multimedia Players), in-vehicle terminals (e.g., in-vehicle navigation terminals), etc. and fixed terminals such as digital TVs, desktop computers, etc. The electronic device shown in FIG. 8 is merely an example and should not impose any limitations on the functionality and scope of use of embodiments of the present disclosure.

As shown in FIG. 8, the electronic device 600 may include a processing device (e.g., a central processing unit, a graph processor, etc.) 601 that may perform various suitable actions and processes in accordance with a program stored in a read only memory (ROM) 602 or a program loaded from a storage device 608 into a random access memory (RAM) 603. In the RAM 603, various programs and data needed by the operation of the electronic device 600 are also stored. The processing device 601, the ROM 602, and the RAM 603 are connected to each other via a bus 604. An input/output (I/O) interface 605 is also coupled to bus 604.

In general, the following devices may be connected to the I/O interface 605: an input device 606 including, for example, a touch screen, a touch pad, a keyboard, a mouse, a camera, a microphone, an accelerometer, a gyroscope, etc.; an output device 607 including, for example, a liquid crystal display (LCD), a speaker, a vibrator, etc.; a storage device 608 including, for example, a magnetic tape, a hard disk, etc.; and a communication device 609. The communication device 609 may allow the electronic device 600 to communicate in a wireless or wired manner with other devices to exchange data. While FIG. 8 illustrates the electronic device 600 having various devices, it is to be understood that not all illustrated device are required to be implemented or provided. More or fewer devices may alternatively be implemented or provided.

In particular, the processes described above with reference to flow charts may be implemented as computer software programs in accordance with embodiments of the present disclosure. For example, embodiments of the present disclosure include a computer program product comprising a computer program carried on a non-transitory computer-readable medium, the computer program comprising program code for performing the method illustrated by the flow charts. In such embodiments, the computer program may be downloaded and installed from a network via the communication means 609, or installed from the storage means 608, or installed from the ROM 602. When the computer program is executed by the processing device 601, the above-described functions defined in the method of the embodiment of the present disclosure are performed.

It is appreciated that the computer-readable medium described above in the present disclosure may be either a computer-readable signal medium or a computer-readable storage medium, or any combination of the two. The computer-readable storage medium may be, for example but not limited to, an electronic, magnetic, optical, electromagnetic, infrared, or semiconductor system, apparatus, or device, or a combination of any of the above. More specific examples of the computer-readable storage medium may comprise, but are not limited to: an electrical connection having one or more wires, a portable computer magnetic disk, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination of the above. In the present disclosure, the computer-readable storage medium may be any tangible medium that contains or stores a program that may be used by or in conjunction with an instruction execution system, apparatus, or device. In the present disclosure, the computer-readable signal medium may include a data signal embodied in baseband or propagated as part of a carrier carrying computer-readable program code. Such propagated data signals may take many forms, including but not limited to, electromagnetic signals, optical signals, or any suitable combinations thereof. The computer-readable signal medium may also be any computer-readable medium other than a computer-readable storage medium that may send, propagate, or transport the program for use by or for use in conjunction with the instruction execution system, apparatus, or device. The program code contained on the computer-readable medium may be transmitted with any suitable medium including, but not limited to: electrical wire, optic cable, RF (radio frequency), and the like, or any suitable combinations thereof.

In some embodiments, the terminal, server may communicate using any currently known or future-developed network protocol, such as HTTP (HyperText Transfer Protocol), and may be interconnected with any form or medium of digital data communication (e.g., a communication network). Examples of the communication network comprise local area networks ("LANs"), wide area networks ("WANs"), international networks (e.g., the Internet), and peer-to-peer networks (e.g., ad hoc peer-to-peer networks), as well as any currently known or future-developed networks.

The computer readable medium may be contained in the above-described electronic device; it may also be present separately and not installed into the electronic device.

The computer-readable medium carries one or more programs that, when executed by the electronic device, cause the electronic device to perform the following: obtaining a specified batch of reference samples of an active participant of a joint training model, wherein the specified batch of reference samples of the active participant includes a first reference sample and a second reference sample, target encryption identification information corresponding to the first reference sample is not the target encryption identification information of the active participant, target encryption identification information corresponding to the second reference sample is the target encryption identification information of the active participant, and the target encryption identification information is obtained by encrypting according to a key of the active participant and a key of a passive participant of the joint training model; determining generation gradient information of the first reference sample, wherein the generation gradient information is determined according to at least one of the following information items: actual gradient information of the second reference sample, generation label information of the first reference sample, and feature information of a specified batch of reference samples of the passive participant; determining target gradient information sent to the passive participant according to the generation gradient information, and sending the target gradient information to the passive participant, to update, by the passive participant, parameters of the joint training model according to the target gradient information.

The computer program code for carrying out operations of the present disclosure may be written in one or more programming languages or combinations thereof. The programming languages include, but not limited to, object-oriented programming languages, such as Java, smalltalk, C++, and conventional procedural programming languages, such as the "C" language or similar programming languages. The program code may be executed entirely on the user's computer, executed partly on the user's computer, executed as a stand-alone software package, executed partly on the user's computer and partly on a remote computer, or executed entirely on the remote computer or a server. In the case of the remote computer, the remote computer may be connected to the user's computer through any type of network, including a local area network (LAN) or a wide area network (WAN), or it may be connected to an external computer (e.g., through the Internet using an Internet Service Provider).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The modules described in connection with the embodiments disclosed herein may be implemented in a software or hardware manner. The names of the modules do not constitute limitations of the modules themselves in a certain case. For example, the obtaining module may be described as "a reference sample obtaining module".

The functions described herein above may be performed, at least in part, by one or more hardware logic components. For example, without limitation, exemplary types of hardware logic components that may be used comprise: a Field Programmable Gate Array (FPGA), an Application Specific Integrated Circuits (ASIC), an Application Specific Standard Products (ASSP), a Systems on Chip (SOC), a Complex Programmable Logic Device (CPLD), and so on.

In the context of the present disclosure, the machine-readable medium may be a tangible medium that may contain or store a program for use by or for use in conjunction with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combinations thereof. More specific examples of the machine-readable storage medium would include an electrical connection based on one or more wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination thereof.

According to one or more embodiments of the present disclosure, Example 1 provides a data protection method, comprising: obtaining a specified batch of reference samples of an active participant of a joint training model, wherein the specified batch of reference samples of the active participant includes a first reference sample and a second reference sample, target encryption identification information corresponding to the first reference sample is not target encryption identification information of the active participant, target encryption identification information corresponding to the second reference sample is the target encryption identification information of the active participant, and the target encryption identification information is obtained by encrypting according to a key of the active participant and a key of a passive participant of the joint training model; determining generation gradient information of the first reference sample, wherein the generation gradient information is determined according to at least one of the following information items: actual gradient information of the second reference sample, generation label information of the first reference sample, and feature information of a specified batch of reference samples of the passive participant; determining target gradient information sent to the passive participant according to the generation gradient information, and sending the target gradient information to the passive participant, to update, by the passive participant, parameters of the joint training model according to the target gradient information.

According to one or more embodiments of the present disclosure, Example 2 provides the method of Example 1, wherein the generation gradient information is determined according to actual gradient information of the second reference sample; the determining generation gradient information of the first reference sample comprises: determining similar reference samples of the first reference sample from the second reference sample; determining the generation gradient information according to the actual gradient information of the similar reference samples.

According to one or more embodiments of the present disclosure, Example 3 provides the method of Example 2, wherein the determining similar reference samples of the first reference sample from the second reference sample comprises: determining, for each of the second reference samples, distance information between the feature information of the second reference sample and the feature information of the first reference sample; traversing the distance information in an ascending order; if the number of the second reference samples which correspond to currently-traversed distance information and are already taken as similar reference samples of other first reference samples is smaller than a first preset number threshold, taking the second reference samples corresponding to the currently-traversed distance information as the similar reference samples of the first reference sample; stopping the traversing if one of the following conditions is satisfied: the traversing of the distance information is completed, and the determined number of similar reference samples of the first reference sample reaches a second preset number threshold.

According to one or more embodiments of the present disclosure, Example 4 provides the method of Example 2, wherein the determining the generation gradient information according to the actual gradient information of the similar reference samples comprises: determining a first gradient mean value of the actual gradient information of the second reference sample; determining a second gradient mean value of the actual gradient information of the similar reference samples; determining the generation gradient information according to the first gradient mean value, the second gradient mean value, noise information, the number of first reference samples in the specified batch of reference samples, and the number of second reference samples in the specified batch of reference samples.

According to one or more embodiments of the present disclosure, Example 5 provides the method of Example 4, wherein the determining the generation gradient information according to the first gradient mean value, the second gradient mean value, noise information, the number of first reference samples in the specified batch of reference samples, and the number of second reference samples in the specified batch of reference samples comprises: determining the generation gradient information by the following equation:

$$g_f^i = n_r\left(\frac{\alpha}{n_f}\bar{g}_r + \frac{(1-\alpha)}{n_r}\bar{g}_n^i\right) + \varepsilon^i$$

where i represents the $i^{th}$ first reference sample in the specified batch of reference samples, $g_f^i$ represents generation gradient information of the $i^{th}$ first reference sample; $n_r$ represents the number of second reference samples in the specified batch of reference samples; $n_f$ represents the number of first reference samples in the specified batch of reference samples, $\bar{g}_r$ represents the first gradient mean value, $\bar{g}_n^i$ represents the second gradient mean value, $\alpha$ represents a preset parameter, and a range of the value of $\alpha$ is [0, 1], and $\varepsilon^i$ represents noise information.

According to one or more embodiments of the present disclosure, Example 6 provides the method of Example 1, wherein the generation gradient information is determined according to the generation label information of the first reference sample; the determining generation gradient information of the first reference sample comprises: setting the generation label information of the first reference sample as a preset value; if the joint training model outputs first logistic regression information that feature information of the first reference sample is a positive case under a data distribution of actual label information of the second reference sample, determining second logistic regression information that the feature information of the first reference sample is a positive case under a data distribution of mixed label information, according to the first logistic regression information and a probability that the identification information corresponding to the first reference sample belongs to an identification set of the active participant, wherein the mixed label information includes the actual label information and the generation label information; determining a training loss function value according to the second logistic regression information, and determining the generation gradient information according to the training loss function value.

According to one or more embodiments of the present disclosure, Example 7 provides the method of Example 6, wherein the method further comprises: determining a test loss function value according to the first logistic regression information, and testing the joint training model according to the test loss function value.

According to one or more embodiments of the present disclosure, Example 8 provides the method of Example 1, wherein the generation gradient information is determined according to the generation label information of the first reference sample; the determining generation gradient information of the first reference sample comprises: setting the generation label information of the first reference sample as a preset value; if the joint training model outputs second logistic regression information that the feature information of the first reference sample is a positive case under data distribution of mixed label information, determining a training loss function value according to the second logistic regression information, wherein the mixed label information includes the generation label information and the actual label information of the second reference sample; determining the generation gradient information according to the training loss function value.

According to one or more embodiments of the present disclosure, Example 9 provides the method of Example 8, wherein the method further comprises: according to the second logistic regression information and a probability that the identification information corresponding to the first reference sample belongs to an identification set of the active participant, determining first logistic regression information that the feature information of the first reference sample is a positive case under the data distribution of the actual label information of the second reference sample; determining a test loss function value according to the first logistic regression information, and testing the joint training model according to the test loss function value.

According to one or more embodiments of the present disclosure, Example 10 provides the method of Example 1, wherein the generation gradient information is determined according to the generation label information of the first reference sample; the determining generation gradient information of the first reference sample comprises: determining a prediction probability that the feature information of the first reference sample is a positive case; determining generation label information of the first reference sample according to the prediction probability; determining a training loss function value according to the generation label information, and determining the generation gradient information according to the training loss function value.

According to one or more embodiments of the present disclosure, Example 11 provides the method of Example 1, wherein the generation gradient information is determined according to feature information of a specified batch of reference samples of the passive participant; the determining generation gradient information of the first reference sample comprises: obtaining feature information of a specified batch of reference samples of the passive participant, the feature information including actual feature information and generation feature information; if the joint training model outputs third logistic regression information that under the data distribution of the actual feature information, the feature information of the first reference sample is a positive case, determining fourth logistic regression information that under the data distribution of mixed feature information, the feature information of the first reference sample is a positive case according to the third logistic regression information and a probability that the identification information corresponding to the first reference sample belong to an identification set of the passive participant, wherein the mixed feature information includes the actual feature information and the generation feature information; determining a training loss function value according to the fourth logistic regression information, and determining the generation gradient information according to the training loss function value.

According to one or more embodiments of the present disclosure, Example 12 provides the method of Example 11, wherein the method further comprises: determining a test loss function value according to the third logistic regression information, and testing the joint training model according to the test loss function value.

According to one or more embodiments of the present disclosure, Example 13 provides the method of Example 1, wherein the generation gradient information is determined according to feature information of a specified batch of reference samples of the passive participant; the generating generation gradient information of the first reference sample comprises: obtaining feature information of a specified batch of reference samples of the passive participant, the feature information including actual feature information and generation feature information; if the joint training model outputs fourth logistic regression information that the feature information of the first reference sample is a positive case under the data distribution of mixed feature information, determining a training loss function value according to the fourth logistic regression information, wherein the mixed feature information includes the actual feature information and the generation feature information; determining the generation gradient information according to the training loss function value.

According to one or more embodiments of the present disclosure, Example 14 provides the method of Example 13, wherein the method further comprises: according to the fourth logistic regression information and a probability that the identification information corresponding to the first reference sample belongs to an identification set of the passive participant, determining third logistic regression information that the feature information of the first reference sample is a positive case under a data distribution of the actual feature information; determining a test loss function value according to the third logistic regression information, and testing the joint training model according to the test loss function value.

According to one or more embodiments of the present disclosure, Example 15 provides the method of Example 1, wherein the generation gradient information is determined according to the generation label information of the first reference sample and feature information of a specified batch of reference samples of the passive participant; the determining generation gradient information of the first reference sample comprises: setting the generation label information of the first reference sample as a preset value; obtaining feature information of a specified batch of reference samples of the passive participant, the feature information including actual feature information and generation feature information; if the joint training model outputs fifth logistic regression information that the feature information of the first reference sample is a positive case under data distribution of the actual label information of the second reference sample and the actual feature information, determining sixth logistic regression information that the feature information of the first reference sample is a positive case under data distribution of mixed feature information and mixed label information, according to the fifth logistic regression information, a probability that the identification information corresponding to the first reference sample belongs to an identification set of the active participant and a probability that the identification information corresponding to the first reference sample belongs to an identification set of the passive participant, wherein the mixed label information includes the generation label information and actual label information of the second reference sample, and the mixed feature information includes the actual feature information and the generation feature information; determining a training loss function value according to the sixth logistic regression information, and determining the generation gradient information according to the training loss function value.

According to one or more embodiments of the present disclosure, Example 16 provides the method of Example 15, wherein the method further comprises: determining a test loss function value according to the fifth logistic regression information, and testing the joint training model according to the test loss function value.

According to one or more embodiments of the present disclosure, Example 17 provides the method of Example 1, wherein the generation gradient information is determined according to the generation label information of the first reference sample and feature information of a specified batch of reference samples of the passive participant; the determining generation gradient information of the first reference sample comprises: setting the generation label information of the first reference sample as a preset value; obtaining feature information of a specified batch of reference samples of the passive participant, the feature information including actual feature information and generation feature information; if the joint training model outputs sixth logistic regression information that the feature information of the first reference sample is a positive case under data distribution of mixed feature information and mixed label information, determining a training loss function value according to the sixth logistic regression information, wherein the mixed label information includes the generation label information and the actual label information of the second reference sample, and the mixed feature information includes the actual feature information and the generation feature information; determining the generation gradient information according to the training loss function value.

According to one or more embodiments of the present disclosure, Example 18 provides the method of Example 17, wherein the method further comprises: determining fifth logistic regression information that the feature information of the first reference sample is a positive case under data distribution of the actual label information of the second reference sample and the actual feature information, according to the sixth logistic regression information, a probability that the identification information corresponding to the first reference sample belongs to an identification set of the active participant and a probability that the identification information corresponding to the first reference sample belongs to an identification set of the passive participant; determining a test loss function value according to the fifth logistic regression information, and testing the joint training model according to the test loss function value.

According to one or more embodiments of the present disclosure, Example 19 provides the method of any of Example 11 through Example 18, wherein the generation feature information in the feature information of the specified batch of reference samples of the passive participant is determined from the actual feature information.

According to one or more embodiments of the present disclosure, Example 20 provides a data protection apparatus, comprising: an obtaining module for obtaining a specified batch of reference samples of an active participant of a joint training model, wherein the specified batch of reference samples of the active participant includes a first reference sample and a second reference sample, target encryption identification information corresponding to the first reference sample is not target encryption identification information of the active participant, target encryption identification information corresponding to the second reference sample is the target encryption identification information of the active participant, and the target encryption identification information is obtained by encrypting according to a key of the active participant and a key of a passive participant of the joint training model; a determination module for determining generation gradient information of the first reference sample, wherein the generation gradient information is determined according to at least one of the following information items: actual gradient information of the second reference sample, generation label information of the first reference sample, and feature information of a specified batch of reference samples of the passive participant; a sending module for determining the target gradient information sent to the passive participant according to the generation gradient information, and send the target gradient information to the passive participant, to update, by the passive participant, parameters of the joint training model according to the target gradient information.

According to one or more embodiments of the present disclosure, Example 21 provides a computer-readable medium on which a computer program stored, the computer program when executed by a processing device, implements the steps of the method according to any of claims 1-19.

According to one or more embodiments of the present disclosure, Example 22 provides an electronic device comprising: storage means on which a computer program is stored; processing means for executing the computer program in the storage means to implement the steps of the method according to any of claims 1-19.

What are described above are only preferred embodiments of the present disclosure and illustrate the technical principles employed. It will be appreciated by those skilled in the art that the scope of the present disclosure is not limited to technical solutions formed by specific combinations of the above technical features, and meanwhile should also include other technical solutions formed by any combinations of the above technical features or equivalent features thereof, for example, technical solutions formed by replacement of the above technical features with technical features having similar functions disclosed by the present disclosure.

In addition, while operations are depicted in a particular order, this should not be understood as requiring that the operations be performed in the particular order shown or in a sequential order. In certain circumstances, multitasking and parallel processing may be advantageous. As such, while several specific implementation details have been included in the above discussion, these should not be construed as limiting the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are merely exemplary forms of implementing the claims. Regarding the apparatus of the above embodiments, specific manners in which various modules perform the operations have been described in detail in the embodiments regarding the method and will not be described in detail herein.

What is claimed is:

1. A data protection method, wherein the method comprises:
    obtaining a specified batch of reference samples of an active participant of a joint training model, wherein the specified batch of reference samples of the active participant includes a first reference sample and a second reference sample, target encryption identification information corresponding to the first reference sample is not target encryption identification information of the active participant, target encryption identification information corresponding to the second reference sample is the target encryption identification information of the active participant, and the target encryption identification information is obtained by encrypting according to a key of the active participant and a key of a passive participant of the joint training model;
    determining generation gradient information of the first reference sample, wherein the generation gradient information is determined according to at least one of the following information items: actual gradient information of the second reference sample, generation label information of the first reference sample, and feature information of a specified batch of reference samples of the passive participant;
    determining target gradient information sent to the passive participant according to the generation gradient information, and sending the target gradient information to the passive participant, to update, by the passive participant, parameters of the joint training model according to the target gradient information.

2. The method according to claim 1, wherein the generation gradient information is determined according to the actual gradient information of the second reference sample;
    the determining generation gradient information of the first reference sample comprises:
        determining similar reference samples of the first reference sample from the second reference sample;
        determining the generation gradient information according to actual gradient information of the similar reference samples.

3. The method according to claim 2, wherein the determining the similar reference samples of the first reference sample from the second reference sample comprises:
    determining, for each of the second reference samples, distance information between the feature information of the second reference sample and the feature information of the first reference sample;
    traversing the distance information in an ascending order;
    if a number of second reference samples which correspond to currently-traversed distance information and are already taken as similar reference samples of other first reference samples is smaller than a first preset number threshold, taking the second reference samples corresponding to the currently-traversed distance information as the similar reference samples of the first reference sample;

stopping the traversing if one of the following conditions is satisfied: the traversing of the distance information is completed, and the determined number of similar reference samples of the first reference sample reaches a second preset number threshold.

4. The method according to claim 2, wherein the determining the generation gradient information according to the actual gradient information of the similar reference samples comprises:

determining a first gradient mean value of the actual gradient information of the second reference sample;

determining a second gradient mean value of the actual gradient information of the similar reference samples;

determining the generation gradient information according to the first gradient mean value, the second gradient mean value, noise information, the number of first reference samples in the specified batch of reference samples, and the number of second reference samples in the specified batch of reference samples.

5. The method according to claim 4, wherein the determining the generation gradient information according to the first gradient mean value, the second gradient mean value, noise information, the number of first reference samples in the specified batch of reference samples, and the number of second reference samples in the specified batch of reference samples comprises:

determining the generation gradient information by the following equation:

$$g_f^i = n_r \left( \frac{\alpha}{n_f} \bar{g}_r + \frac{(1-\alpha)}{n_r} \bar{g}_n^i \right) + \varepsilon^i$$

where i represents the $i^{th}$ first reference sample in the specified batch of reference samples, $g_f^i$ represents generation gradient information of the $i^{th}$ first reference sample; $n_r$ represents the number of second reference samples in the specified batch of reference samples; $n_f$ represents the number of first reference samples in the specified batch of reference samples, $\bar{g}_r$ represents the first gradient mean value, $\bar{g}_n^i$ represents the second gradient mean value, $\alpha$ represents a preset parameter, a range of the value of $\alpha$ is [0, 1], and $\varepsilon^i$ represents the noise information.

6. The method according to claim 1, wherein the generation gradient information is determined according to the generation label information of the first reference sample;

the determining generation gradient information of the first reference sample comprises:

setting the generation label information of the first reference sample as a preset value;

if the joint training model outputs first logistic regression information that feature information of the first reference sample is a positive case under a data distribution of actual label information of the second reference sample, determining second logistic regression information that the feature information of the first reference sample is a positive case under a data distribution of mixed label information according to the first logistic regression information and a probability that the identification information corresponding to the first reference sample belongs to an identification set of the active participant, wherein the mixed label information includes the actual label information and the generation label information;

determining a training loss function value according to the second logistic regression information, and determining the generation gradient information according to the training loss function value.

7. The method according to claim 6, wherein the method further comprises:

determining a test loss function value according to the first logistic regression information, and testing the joint training model according to the test loss function value.

8. The method according to claim 1, wherein the generation gradient information is determined according to the generation label information of the first reference sample;

the determining generation gradient information of the first reference sample comprises:

setting the generation label information of the first reference sample as a preset value;

if the joint training model outputs second logistic regression information that feature information of the first reference sample is a positive case under a data distribution of mixed label information, determining a training loss function value according to the second logistic regression information, wherein the mixed label information includes the generation label information and the actual label information of the second reference sample;

determining the generation gradient information according to the training loss function value.

9. The method according to claim 8, wherein the method further comprises:

according to the second logistic regression information and a probability that the identification information corresponding to the first reference sample belongs to an identification set of the active participant, determining first logistic regression information that the feature information of the first reference sample is a positive case under the data distribution of the actual label information of the second reference sample;

determining a test loss function value according to the first logistic regression information, and testing the joint training model according to the test loss function value.

10. The method according to claim 1, wherein the generation gradient information is determined according to the generation label information of the first reference sample;

the determining generation gradient information of the first reference sample comprises:

determining a prediction probability that the feature information of the first reference sample is a positive case;

determining the generation label information of the first reference sample according to the prediction probability;

determining a training loss function value according to the generation label information, and determining the generation gradient information according to the training loss function value.

11. The method according to claim 1, wherein the generation gradient information is determined according to feature information of a specified batch of reference samples of the passive participant;

the determining generation gradient information of the first reference sample comprises:
    obtaining the feature information of the specified batch of reference samples of the passive participant, the feature information including actual feature information and generation feature information;
    if the joint training model outputs third logistic regression information that feature information of the first reference sample is a positive case under a data distribution of the actual feature information, determining fourth logistic regression information that the feature information of the first reference sample is a positive case under a data distribution of mixed feature information according to the third logistic regression information and a probability that the identification information corresponding to the first reference sample belong to an identification set of the passive participant, wherein the mixed feature information includes the actual feature information and the generation feature information;
    determining a training loss function value according to the fourth logistic regression information, and determining the generation gradient information according to the training loss function value.

12. The method according to claim 11, wherein the method further comprises:
    determining a test loss function value according to the third logistic regression information, and testing the joint training model according to the test loss function value.

13. The method according to claim 1, wherein the generation gradient information is determined according to feature information of a specified batch of reference samples of the passive participant;
    the determining generation gradient information of the first reference sample comprises:
        obtaining feature information of the specified batch of reference samples of the passive participant, the feature information including actual feature information and generation feature information;
        if the joint training model outputs fourth logistic regression information that feature information of the first reference sample is a positive case under a data distribution of mixed feature information, determining a training loss function value according to the fourth logistic regression information, wherein the mixed feature information includes the actual feature information and the generation feature information;
        determining the generation gradient information according to the training loss function value.

14. The method according to claim 13, wherein the method further comprises:
    determining third logistic regression information that the feature information of the first reference sample is a positive case under a data distribution of the actual feature information according to the fourth logistic regression information and a probability that the identification information corresponding to the first reference sample belongs to an identification set of the passive participant;
    determining a test loss function value according to the third logistic regression information, and testing the joint training model according to the test loss function value.

15. The method according to claim 1, wherein the generation gradient information is determined according to the generation label information of the first reference sample and feature information of a specified batch of reference samples of the passive participant;
    the determining generation gradient information of the first reference sample comprises:
        setting the generation label information of the first reference sample as a preset value;
        obtaining feature information of a specified batch of reference samples of the passive participant, the feature information including actual feature information and generation feature information;
        if the joint training model outputs fifth logistic regression information that feature information of the first reference sample is a positive case under a data distribution of the actual label information of the second reference sample and the actual feature information, determining sixth logistic regression information that the feature information of the first reference sample is a positive case under a data distribution of mixed feature information and mixed label information according to the fifth logistic regression information, a probability that the identification information corresponding to the first reference sample belongs to an identification set of the active participant and a probability that the identification information corresponding to the first reference sample belongs to an identification set of the passive participant, wherein the mixed label information includes the generation label information and actual label information of the second reference sample, and the mixed feature information includes the actual feature information and the generation feature information;
        determining a training loss function value according to the sixth logistic regression information, and determining the generation gradient information according to the training loss function value.

16. The method according to claim 15, wherein the method further comprises:
    determining a test loss function value according to the fifth logistic regression information, and testing the joint training model according to the test loss function value.

17. The method according to claim 1, wherein the generation gradient information is determined according to generation label information of the first reference sample and the feature information of a specified batch of reference samples of the passive participant;
    the determining generation gradient information of the first reference sample comprises:
        setting the generation label information of the first reference sample as a preset value;
        obtaining the feature information of a specified batch of reference samples of the passive participant, the feature information including actual feature information and generation feature information;
        if the joint training model outputs sixth logistic regression information that feature information of the first reference sample is a positive case under a data distribution of mixed feature information and mixed label information, determining a training loss function value according to the sixth logistic regression information, wherein the mixed label information includes the generation label information and the actual label information of the second reference sample, and the mixed feature information includes the actual feature information and the generation feature information;

determining the generation gradient information according to the training loss function value.

18. The method according to claim 17, wherein the method further comprises:

determining fifth logistic regression information that feature information of the first reference sample is a positive case under a data distribution of the actual label information of the second reference sample and the actual feature information according to the sixth logistic regression information, a probability that the identification information corresponding to the first reference sample belongs to an identification set of the active participant and a probability that the identification information corresponding to the first reference sample belongs to an identification set of the passive participant;

determining a test loss function value according to the fifth logistic regression information, and testing the joint training model according to the test loss function value, and wherein the generation feature information in the feature information of the specified batch of reference samples of the passive participant is determined from the actual feature information.

19. A non-transitory computer-readable medium on which a computer program stored, wherein the program, when executed by a processing device, implements a method, the method comprising:

obtaining a specified batch of reference samples of an active participant of a joint training model, wherein the specified batch of reference samples of the active participant includes a first reference sample and a second reference sample, target encryption identification information corresponding to the first reference sample is not target encryption identification information of the active participant, target encryption identification information corresponding to the second reference sample is the target encryption identification information of the active participant, and the target encryption identification information is obtained by encrypting according to a key of the active participant and a key of a passive participant of the joint training model;

determining generation gradient information of the first reference sample, wherein the generation gradient information is determined according to at least one of the following information items: actual gradient information of the second reference sample, generation label information of the first reference sample, and feature information of a specified batch of reference samples of the passive participant;

determining target gradient information sent to the passive participant according to the generation gradient information, and sending the target gradient information to the passive participant, to update, by the passive participant, parameters of the joint training model according to the target gradient information.

20. An electronic device, comprising:

storage means on which a computer program is stored;

processing means for executing the computer program in the storage means to perform:

obtaining a specified batch of reference samples of an active participant of a joint training model, wherein the specified batch of reference samples of the active participant includes a first reference sample and a second reference sample, target encryption identification information corresponding to the first reference sample is not target encryption identification information of the active participant, target encryption identification information corresponding to the second reference sample is the target encryption identification information of the active participant, and the target encryption identification information is obtained by encrypting according to a key of the active participant and a key of a passive participant of the joint training model;

determining generation gradient information of the first reference sample, wherein the generation gradient information is determined according to at least one of the following information items: actual gradient information of the second reference sample, generation label information of the first reference sample, and feature information of a specified batch of reference samples of the passive participant;

determining target gradient information sent to the passive participant according to the generation gradient information, and sending the target gradient information to the passive participant, to update, by the passive participant, parameters of the joint training model according to the target gradient information.

* * * * *